United States Patent
Stovicek et al.

(10) Patent No.: US 10,511,559 B2
(45) Date of Patent: Dec. 17, 2019

(54) MANAGEMENT AND DISPLAY OF GROUPED MESSAGES ON A COMMUNICATION DEVICE

(71) Applicant: BlackBerry Limited, Waterloo (CA)

(72) Inventors: Thomas Jan Stovicek, San Francisco, CA (US); Darsono Sutedja, Andover, MA (US); Ryan Andrew John Degorter, Ottawa (CA); Scott Arnold, Etobicoke (CA); John Bennett Parrett, Amherst, NH (US); Francis Patrick Judge, Andover, MA (US)

(73) Assignee: BlackBerry Limited, Waterloo, Ontario (CA)

(*) Notice: Subject to any disclaimer, the term of this patent is extended or adjusted under 35 U.S.C. 154(b) by 748 days.

(21) Appl. No.: 14/245,246

(22) Filed: Apr. 4, 2014

(65) Prior Publication Data

US 2014/0222933 A1    Aug. 7, 2014

Related U.S. Application Data

(63) Continuation of application No. 12/966,077, filed on Dec. 13, 2010, now abandoned.

(60) Provisional application No. 61/316,247, filed on Mar. 22, 2010.

(51) Int. Cl.
*H04L 12/58* (2006.01)

(52) U.S. Cl.
CPC .................... *H04L 51/16* (2013.01)

(58) Field of Classification Search
CPC ................................................ G06F 3/0485
See application file for complete search history.

(56) References Cited

U.S. PATENT DOCUMENTS 5,923,327 A    7/1999   Smith et al.
6,292,880 B1   9/2001   Mattis et al.
(Continued)

FOREIGN PATENT DOCUMENTS

EP     1689137 A1   8/2006
EP     1691516 A1   8/2006
(Continued)

OTHER PUBLICATIONS

Jitkoff et al, Expandable and collapsible information panels, Oct. 13, 2009, U.S. Appl. No. 61/251,289, all pages.*

(Continued)

*Primary Examiner* — Jerry B Dennison
(74) *Attorney, Agent, or Firm* — Rowand LLP

(57) ABSTRACT

A system and method for managing a plurality of messages stored at a mobile communication device, groups messages based on a common subject line or another quasi-unique identifier, and displays message group entries representing distinct message groups in a user interface. The message group entries may be displayed in association with an icon representing multiple message states associated with individual messages comprised within that message group. The multiple message states may include all messages being read, all messages being unread, a most recently received message being unread while others are read, and a most recently received message being read while order messages are unread.

16 Claims, 14 Drawing Sheets

(56) References Cited

U.S. PATENT DOCUMENTS

| | | | |
|---|---|---|---|
| 6,741,232 B1* | 5/2004 | Siedlikowski | G06F 1/1626 345/156 |
| 6,792,448 B1 | 9/2004 | Smith | |
| 7,117,246 B2 | 10/2006 | Christenson et al. | |
| 7,680,895 B2 | 3/2010 | Perlow et al. | |
| 7,899,871 B1 | 3/2011 | Kumar et al. | |
| 7,912,904 B2 | 3/2011 | Buchheit et al. | |
| 8,676,901 B1* | 3/2014 | Nicolaou | H04L 51/08 709/203 |
| 8,893,036 B1* | 11/2014 | Wabyick | G06F 3/0485 715/785 |
| 9,063,645 B1 | 6/2015 | Jitkoff | G06F 16/904 |
| 2002/0161788 A1 | 10/2002 | McDonald | |
| 2004/0044735 A1 | 3/2004 | Hoblit | |
| 2004/0119740 A1 | 6/2004 | Chang et al. | |
| 2004/0221295 A1 | 11/2004 | Kawai et al. | |
| 2005/0240880 A1* | 10/2005 | Banks | G06F 3/04817 715/836 |
| 2005/0257043 A1 | 11/2005 | Adams et al. | |
| 2006/0128404 A1* | 6/2006 | Klassen | H04L 51/16 455/466 |
| 2006/0277504 A1* | 12/2006 | Zinn | G06F 3/0482 715/864 |
| 2007/0005715 A1 | 1/2007 | LaVasseur et al. | |
| 2007/0282953 A1 | 12/2007 | Jain et al. | |
| 2008/0028027 A1 | 1/2008 | Jachner | |
| 2008/0109462 A1 | 5/2008 | Adams et al. | |
| 2008/0201664 A1* | 8/2008 | O | G06Q 10/107 715/835 |
| 2008/0307364 A1* | 12/2008 | Chaudhri | G06F 3/0483 715/836 |
| 2009/0007006 A1* | 1/2009 | Liu | G06F 1/1694 715/784 |
| 2009/0319619 A1 | 12/2009 | Affronti et al. | |
| 2010/0017872 A1* | 1/2010 | Goertz | G06F 3/0481 726/16 |
| 2010/0179833 A1* | 7/2010 | Roizen | G06Q 50/10 705/3 |
| 2010/0325005 A1 | 12/2010 | Benisti et al. | |
| 2010/0333014 A1* | 12/2010 | Fritzley | G06F 3/0482 715/784 |
| 2011/0072363 A1* | 3/2011 | Mandel | G06Q 10/107 715/752 |

FOREIGN PATENT DOCUMENTS

| | | |
|---|---|---|
| EP | 1718015 A1 | 11/2006 |
| WO | 05013571 A1 | 2/2005 |
| WO | 2006083820 A2 | 8/2006 |

OTHER PUBLICATIONS

Kennberg, A., "New Gmail for the iPhone", Gmail blog, Jan. 14, 2008, http://gmailblog.blogspot.com/2008/01/new-gmail-for-iphone.html.

Extended European Search report dated May 28, 2013, in corresponding European patent application No. 10194808.1.

* cited by examiner

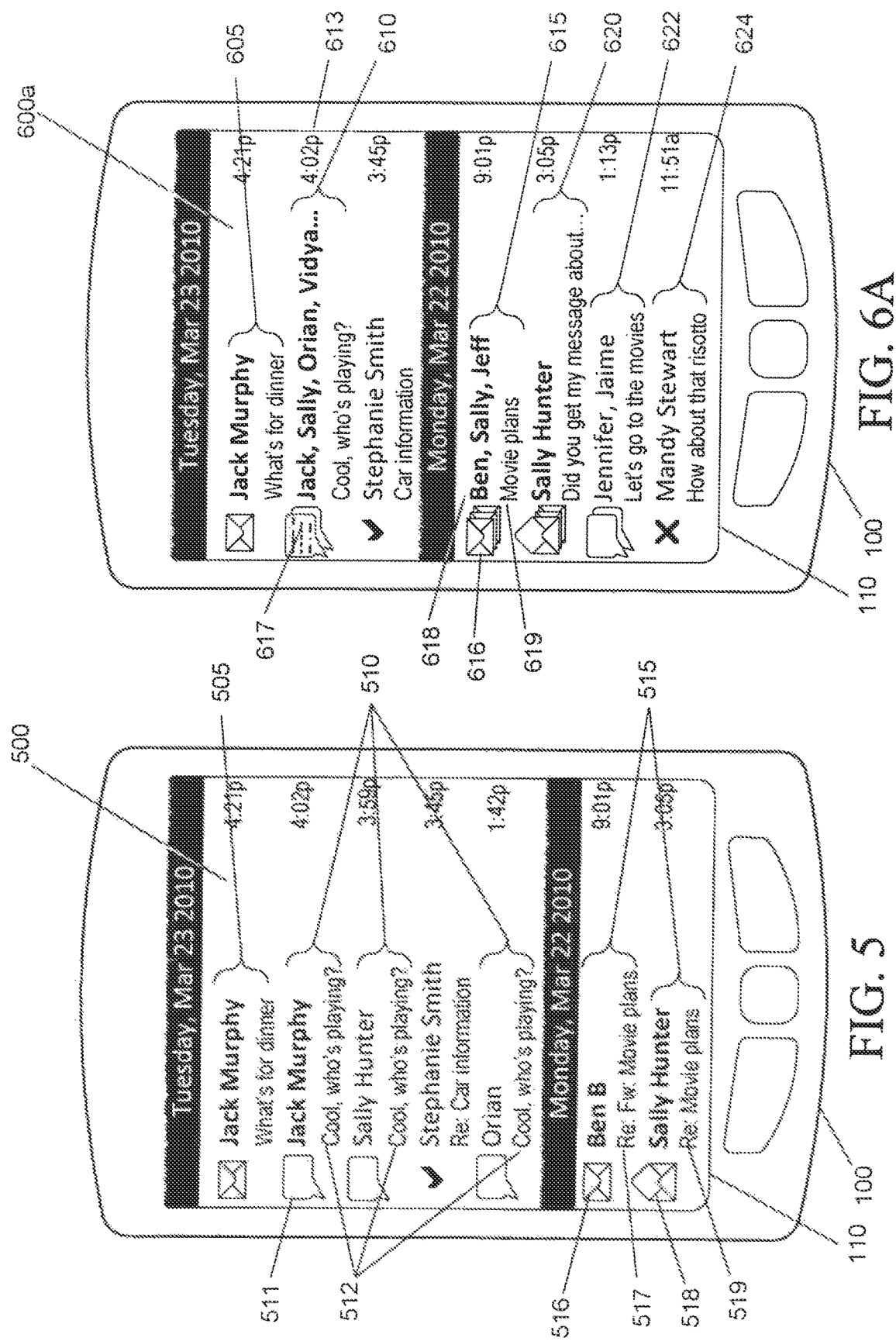

FIG. 7A

| State | Single message | Examples | Message thread/group with multiple messages | Examples |
|---|---|---|---|---|
| unread (unopened) message/new and unread message | received message is unread/new and unread | ✉ 702<br>✉ 704 | all messages unread/new and unread | ✉ 706  ✉ 708<br>✉ 710 |
| | | | most recent message unread/new and unread; older message(s) read | ✉ 712 |
| | | | earlier message in group unread icon, more recent message(s) read | ✉ 714  ✉ 718 |
| read (opened) message | message is read (opened) | ✉ 720 | all messages read (opened) | ✉ 722 |
| draft message | message is draft message | 📝 724 | draft message within thread/group | 📝 726 |
| sent message | message was sent from device/user account | ✓ 728 | most recent message was sent from device/user account | ✓ 730 |
| attachment | message has attachment | ✉ 732<br>✉ 734 | message in thread/group has attachment | ✉ 736<br>✉ 738 |
| signing/encryption | message is encrypted or signed | ✉ 740<br>✉ 742 | message in thread/group is encrypted or signed | ✉ 744<br>✉ 746 |
| calendar events | message is meeting invitation | 👥 748 | thread/group contains meeting invitation | 👥 750 |

FIG. 7B

| filed in folder | message is filed | 752 / 754 | thread/group is filed | 758 / 762 / 760 |
| --- | --- | --- | --- | --- |
| sending | message is being sent | 764 / 766 | message in thread/group is being sent | 768 / 770 |
| transmission failure | message transmission failed | 772 / 774 | transmission of most recent message failed | 776 |
| importance or priority | important or priority message | 778 | message in thread/group is marked as important or high priority | 780 |

FIG. 7C

| State | Message thread/group with multiple messages | Examples |
| --- | --- | --- |
| draft message | message in thread/group is draft message | 782 |
| attachment | message in thread/group has attachment | 784 |
| signing/encryption | message in thread/group is encrypted or signed | 786 |
| calendar events | thread/group contains meeting invitation | 788 |
| filed in folder | thread/group is filed | 790 |
| transmission failure | failed transmission in thread/group | 792 / 794 |
| importance or priority | message in thread/group is marked as important or high priority | 796 / 798 |

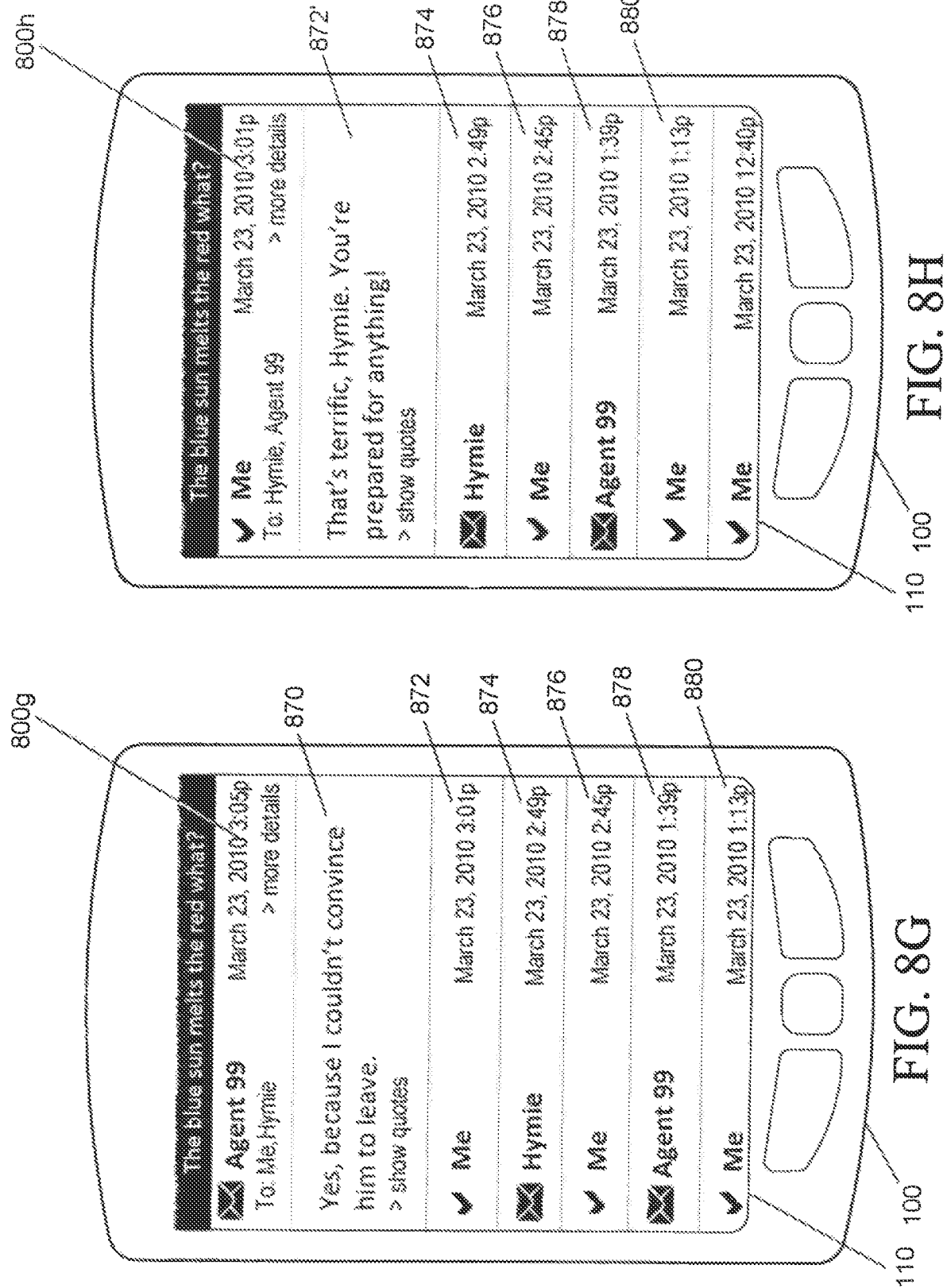

MANAGEMENT AND DISPLAY OF GROUPED MESSAGES ON A COMMUNICATION DEVICE

CROSS-REFERENCE TO RELATED APPLICATIONS

This application is a continuation of U.S. patent application Ser. No. 12/966,077 filed Dec. 13, 2010, which claims priority to U.S. Provisional Application No. 61/316,247 filed 22 Mar. 2010, the entireties of which are incorporated herein by reference.

BACKGROUND

1. Technical Field

The present application relates generally to management and display of multiple messages on a communication device.

2. Description of the Related Art

Communication devices are typically provided with one or more messaging applications and services for sending and receiving messages using one or more transports or formats, such as electronic mail (e-mail), instant messaging (IM), short message service (SMS), multimedia messaging service (MMS) and the like. The user of a communication device may make use of several of these services, and generate a large volume of messages sent to and received from correspondents.

BRIEF DESCRIPTION OF THE DRAWINGS

In drawings which illustrate by way of example only embodiments of the present application.

FIG. 5 is a schematic representation of a user interface comprising a list of messages.

FIGS. 6A, 6B and 6C are further schematic representations of a user interface comprising a list of messages and message groups.

FIGS. 7A, 7B and 7C are charts illustrating possible primary and secondary icons corresponding to message and message group states.

FIGS. 8A through 8H are schematic representations of user interfaces displaying message groups.

DETAILED DESCRIPTION

Figure 1:
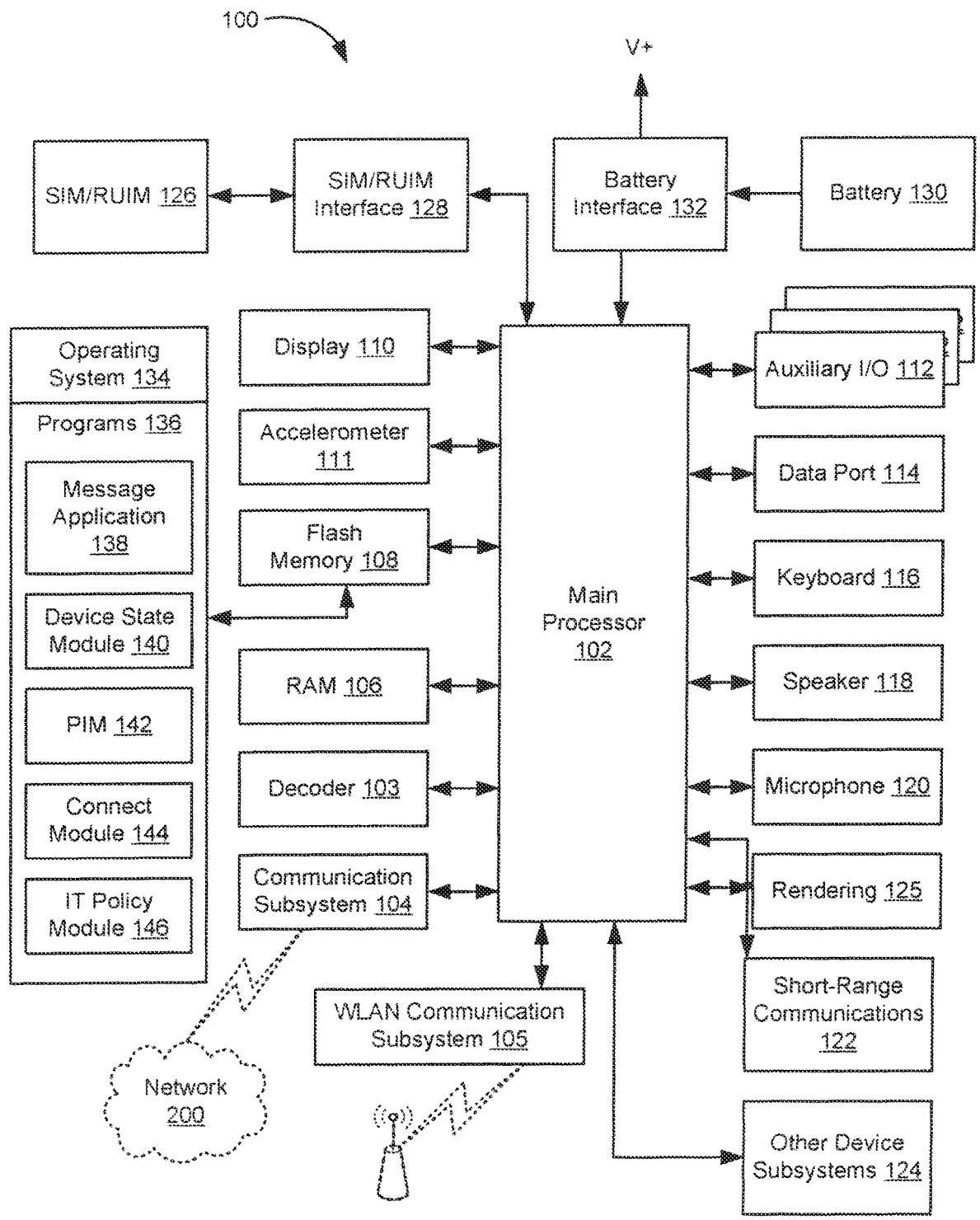
FIG. 1 is a block diagram of an embodiment of a mobile device.

A communication device may be provisioned with a number of messaging services and applications, permitting communications using one or more of a number of formats or transports which may include, without limiting the scope of such services or applications, e-mail, IM, SMS, MMS, voicemail, and VVM and the like. Any one of the forgoing message formats may be associated with a unique application or service provisioned on the communication device 100, or alternatively a plurality of applications or services may be provisioned on the device for a single message format.

The user of a communication device may generate a large amount of correspondence with recipients as messages are sent and received. When these messages are displayed at the communication device, for example in a single message inbox interface, it may be difficult for the user to locate a particular message due to the sheer volume of messages listed in the interface. This problem may be exacerbated if the interface also displays messages received in other formats or using different transports—the message listing for an inbox containing both SMS and e-mail messages, for example, may appear far more cluttered, and it may be even more difficult to quickly locate a particular message entry in the interface. Also, during the course of correspondence with one or more recipients, the user may send or receive messages that either respond to or forward earlier messages. Message listings are commonly displayed in chronological or reverse chronological order. As a result, messages relating to the same thread of correspondence may not be displayed together, rendering it difficult for the user to locate messages relevant to that thread, or to ascertain the status of the conversation represented by the correspondence. Therefore, the embodiments described herein provide an improved system for management and display of messages on a communication device.

In accordance with the embodiments described herein, there is provided a communication device configured to display messages, the communication device comprising at least one transceiver configured to receive and transmit messages in communication with a processor; a memory; a display; and a conversations manager module configured to determine a message group identifier for each one of a plurality of messages, the message group identifier being derived from at least an account identifier for an account associated with said message and a message subject value for said message; store in the memory said message group identifier in association with its corresponding message; and display, using the display, a listing of message group items, each message group item representing at least one message associated with a particular message group identifier.

In a further aspect, the at least one transceiver is configured to receive and transmit messages using a plurality of transports.

In another aspect, the plurality of messages comprises messages associated with a plurality of messaging accounts.

In still a further aspect, the conversations manager module is further configured to determine the message subject value as either a value derived from at least a portion of subject line content of the message, or a predefined value if the message comprises no subject line content.

In yet a further aspect, the message subject value comprises one of a hash of at least a portion of the subject line content of the message, or a value derived from the portion of the subject line content excluding any prefixes or tokens.

In another aspect, the conversations manager module is further configured to derive the account identifier from an address associated with the account. In still a further aspect, the conversations manager module is further configured to carry out said determining and storing as each message is stored at the communication device. Further, the conversations manager module may be further configured to, for at least one further message without subject line content, associate a message group identifier comprising a predefined value, and store said message group identifier in association with said further message in the memory.

In a further aspect of the within embodiments, the listing is ordered in one of chronological, reverse chronological, priority, or alphabetical order.

In yet another aspect, each message group item represents at least a subset of a plurality of messages associated with the same particular message group identifier.

Further, the embodiments described herein provide a method for displaying a listing of messages stored at a communication device, the method comprising: determining a message group identifier for each one of a plurality of messages, the message group identifier being derived from at least an account identifier for an account associated with said message and a message subject value for said message; storing said message group identifier in association with its corresponding message; and displaying a listing of message group items, each message group item representing at least one message associated with a particular message group identifier.

In another aspect of the above method, the plurality of messages comprises messages received or transmitted using a plurality of transports.

In a further aspect, the plurality of messages comprises messages associated with a plurality of messaging accounts.

In still a further aspect, the message subject value comprises either a value derived from at least a portion of subject line content of the message, or a predefined value if the message comprises no subject line content.

In yet another aspect, the message subject value comprises one of a hash of at least a portion of the subject line content of the message; or a value derived from the portion of the subject line content excluding any prefixes or tokens.

Further, in the within embodiments, the account identifier may be derived from an address associated with the account, and alternatively or optionally the listing may be ordered in one of chronological, reverse chronological, priority, or alphabetical order, and each message group item represents at least a subset of a plurality of messages associated with the same particular message group identifier.

In still a further aspect of the above method, said determining and storing is carried out as each message is stored at the communication device.

In yet a further aspect, a message group identifier comprising a predefined value is associated with at least one further message without subject line content, and said message group identifier is stored in association with said further message.

There is also provided a method for grouping messages received at a communication device, the method comprising receiving, while content protection is enabled at the communication device, at least one message; obtaining header data from the at least one message as it is received at the communication device; storing the received at least one message in encrypted form at the communication device; generating a message group identifier using the header data for each said message; queuing each said message group identifier; and when content protection is disabled, for each message associated with a queued message group identifier, determining a further message group identifier for from at least an account identifier for an account associated with said message and a message subject value for said message, and storing said further message group identifier in association with said message.

The embodiments described herein also provide a computer-readable medium, which may be physical or non-transitory, comprising code executable by a communication device to carry out the methods detailed above.

The embodiments described herein also provide a communication device configured to group received messages, the device comprising at least one transceiver configured to receive and transmit messages in communication with a processor; a memory; a display; and a transmission service module configured to receive, while content protection is enabled at the communication device, at least one message; obtain header data from the at least one message as it is received at the communication device and to provide said header data to a conversations manager module at the communication device; and store the received at least one message in encrypted form in the memory; and the conversations manager module being configured to generate a message group identifier using the header data for each said message; queue each said message group identifier; and when content protection is disabled, for each message associated with a queued message group identifier, determine a further message group identifier for from at least an account identifier for an account associated with said message and a message subject value for said message, and store said further message group identifier in association with said message in the memory.

There is also provided a communication device, comprising a display for displaying user interface comprising a listing of message group items, each said message group item representing a set of messages stored at the communication device and being associated with a corresponding message group identifier, each said message group item further being denoted by an icon representative of a plurality of states associated with the set of messages represented by said message group item, the plurality of states comprising one of: all but a most recently received message comprised in the set of messages being marked read on the communications device; and the most recently received message comprised in the set of messages being marked read while at least one message comprised in the set of messages and received prior to said most recently received message is not marked read.

These embodiments will be described primarily in relation to a mobile wireless communication device, hereafter referred to as a communication device. It will be appreciated by those skilled in the art, however, that this description is not intended to limit the scope of the described embodiments to wireless communication devices. The methods and systems described herein may be applied to any appropriate communication or data processing device, whether portable or wirelessly enabled or not, including without limitation cellular phones, smartphones, wireless organizers, personal digital assistants, desktop computers, terminals, laptops, tablets, handheld wireless communication devices, wirelessly-enabled notebook computers and the like. Further, the embodiments below are described primarily in relation to e-mail communications, but it will also be appreciated by those skilled in the art that the below systems and methods may be implemented with other messaging formats and transports such as SMS, MMS, IM, voicemail, VVM, and other network message formats.

Figure 2:
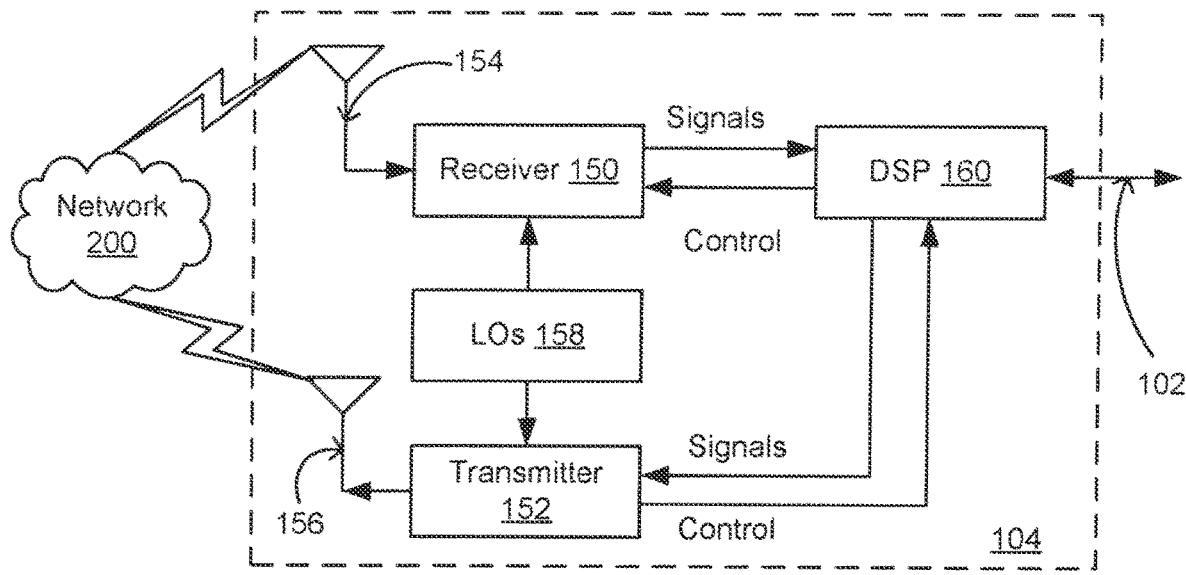
FIG. 2 is a block diagram of an embodiment of a communication subsystem component of the mobile device of FIG. 1.
Figure 3:
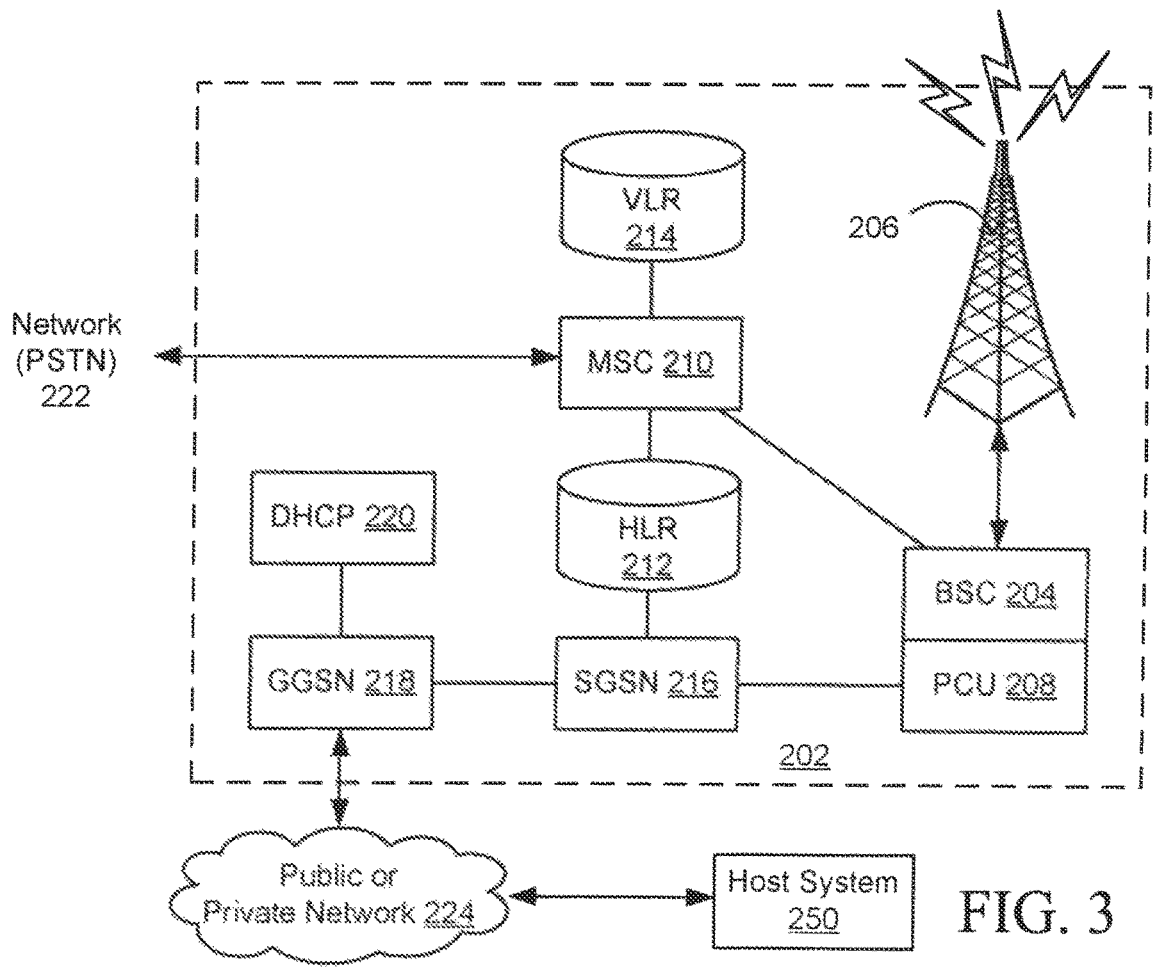
FIG. 3 is an exemplary block diagram of a node of a wireless network for use with the mobile device of FIG. 1.
Figure 4:
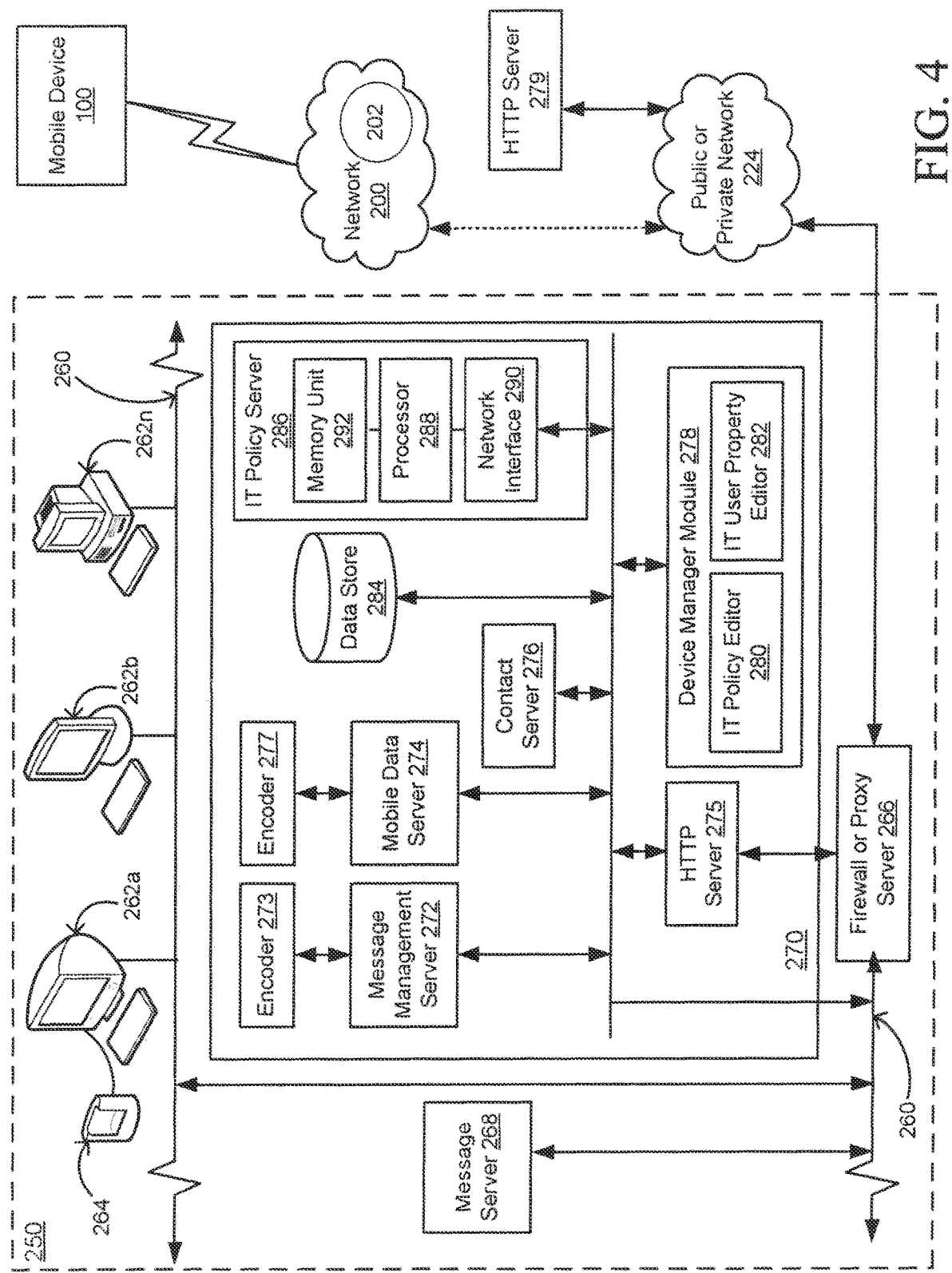
FIG. 4 is a block diagram illustrating components of a host system in one exemplary configuration for use with the wireless network of FIG. 3 and the mobile device of FIG. 1.

The embodiments described herein may be implemented on a communication device such as that illustrated in FIGS. 1 and 2. The communication device may communicate with other devices over a wireless communication system or enterprise system as illustrated in FIGS. 3 and 4. The communication device 100 may be a mobile device with two-way communication and advanced data communication capabilities including the capability to communicate with other mobile devices or computer systems through a network of transceiver stations. The communication device 100 can also have voice communication capabilities. Throughout the specification, terms such as "may" and "can" are used interchangeably and use of any particular term should not be construed as limiting the scope or requiring experimentation to implement the claimed subject matter or embodiments described herein.

FIG. 1 is a block diagram of an exemplary embodiment of a communication device 100. The communication device 100 includes a number of components such as a main processor 102 that controls the overall operation of the communication device 100. Communication functions, including data and voice communications, are performed through a communication subsystem 104. Data received by the communication device 100 can be decompressed and decrypted by decoder 103, operating according to any suitable decompression techniques, and encryption/decryption techniques according to various standards, such as Data Encryption Standard (DES), Triple DES, or Advanced Encryption Standard (AES)). Image data is typically compressed and decompressed in accordance with appropriate standards, such as JPEG, while video data is typically compressed and decompressed in accordance with appropriate standards, such as H.26x and MPEG-x series standards.

The communication subsystem 104 receives messages from and sends messages to a wireless network 200. In this exemplary embodiment of the communication device 100, the communication subsystem 104 is configured in accordance with one or more of Global System for Mobile Communication (GSM), General Packet Radio Services (GPRS) standards, Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM, GPRS, EDGE, or UMTS, and optionally other network communications. With newer network protocols, these channels are capable of supporting both circuit switched voice communications and packet switched data communications.

Other wireless networks can also be associated with the communication device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks, third-generation (3G) networks like EDGE, HSPA, HSPA+, EVDO and fourth-generation (4G) networks such as LTE and LTE Advanced. Some other examples of data-centric networks include WiFi 802.11™, Mobitex™ and DataTAC™ network communication systems. Examples of other voice-centric data networks include Personal Communication Systems (PCS) networks like GSM and Time Division Multiple Access (TDMA) systems. The mobile device 100 may be provided with additional communication subsystems, such as the wireless LAN (WLAN) communication subsystem 105 also shown in FIG. 1. The WLAN communication subsystem may operate in accordance with a known network protocol such as one or more of the 802.11™ family of standards developed by IEEE. The communication subsystem 105 may be separate from, or integrated with, the communication subsystem 104 or with the short-range communications module 122. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The communication device may also be provided with an accelerometer 111, which may be used to detect gravity- or motion-induced forces and their direction. Detection of such forces applied to the device 100 may be processed to determine a response of the device 100, such as an orientation of a graphical user interface displayed on the display assembly 110 in response to a determination of the current orientation of which the device 100.

Some of the subsystems of the communication device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list.

A rendering circuit 125 is included in the device 100. When a user specifies that a data file is to be viewed on the display 110, the rendering circuit 125 analyzes and processes the data file for visualization on the display 110. Rendering data files originally optimized or prepared for visualization on large-screen displays on a portable electronic device display often requires additional processing prior to visualization on the small-screen portable electronic device displays. This additional processing may be accomplished by the rendering engine 125. As will be appreciated by those of skill in the art, the rendering engine can be implemented in hardware, software, or a combination thereof, and can comprise a dedicated image processor and associated circuitry, or can be implemented within main processor 102.

The communication device 100 can send and receive communication signals over the wireless network 200 after required network registration or activation procedures have been completed. Network access is associated with a subscriber or user of the communication device 100. To identify a subscriber, the communication device 100 requires a SIM/RUIM card 126 (i.e. Subscriber Identity Module or a Removable User Identity Module) or another suitable identity module to be inserted into a SIM/RUIM interface 128 in order to communicate with a network. The SIM/RUIM card 126 is one type of a conventional "smart card" that can be used to identify a subscriber of the communication device 100 and to personalize the communication device 100, among other things. Without the SIM/RUIM card 126, the communication device 100 is not fully operational for communication with the wireless network 200. By inserting the SIM/RUIM card 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM/RUIM card 126 includes a processor and memory for storing information. Once the SIM/RUIM card 126 is inserted into the SIM/RUIM interface 128, it is coupled to the main processor 102. In order to identify the subscriber, the SIM/RUIM card 126 can include some user parameters such as an International Mobile Subscriber Identity (IMSI). An advantage of using the SIM/RUIM card 126 is that a subscriber is not necessarily bound by any single physical mobile device. The SIM/RUIM card 126 can store additional subscriber information for a mobile device as well, including datebook (or calendar) information and recent call information. Alternatively, user identification information can also be programmed into the flash memory 108.

The communication device 100 may be a battery-powered device including a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the communication device 100. Although current technology makes use of a battery, future technologies such as micro fuel cells can provide the power to the communication device 100.

The communication device 100 also includes an operating system 134 and software components 136 to 146 which are described in more detail below. The operating system 134 and the software components 136 to 146 that are executed by the main processor 102 are typically stored in a persistent store such as the flash memory 108, which can alternatively be a read-only memory (ROM) or similar storage element (not shown). Those skilled in the art will appreciate that portions of the operating system 134 and the software components 136 to 146, such as specific device applications, or parts thereof, can be temporarily loaded into a volatile store such as the RAM 106. Other software components can also be included, as is well known to those skilled in the art.

The subset of software applications 136 that control basic device operations, including data and voice communication applications, will normally be installed on the communication device 100 during its manufacture. Other software applications include a message application 138 that can be any suitable software program that allows a user of the communication device 100 to send and receive electronic messages. Various alternatives exist for the message application 138 as is well known to those skilled in the art. Messages that have been sent or received by the user are typically stored in the flash memory 108 of the communication device 100 or some other suitable storage element in the communication device 100. In at least some embodiments, some of the sent and received messages can be stored remotely from the device 100 such as in a data store of an associated host system that the communication device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the communication device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the communication device 100 with respect to such items. This can be particularly advantageous when the host computer system is the mobile device subscriber's office computer system.

The communication device 100 also includes a connect module 144, and an information technology (IT) policy module 146. The connect module 144 implements the communication protocols that are required for the communication device 100 to communicate with the wireless infrastructure and any host system, such as an enterprise system, that the communication device 100 is authorized to interface with. Examples of a wireless infrastructure and an enterprise system are given in FIGS. 3 and 4, which are described in more detail below.

The connect module 144 includes a set of Application Programming Interfaces (APIs) that can be integrated with the communication device 100 to allow the communication device 100 to use any number of services associated with the enterprise system. The connect module 144 allows the communication device 100 to establish an end-to-end secure, authenticated communication pipe with the host system. A subset of applications for which access is provided by the connect module 144 can be used to pass IT policy commands from the host system to the communication device 100. This can be done in a wireless or wired manner. These instructions can then be passed to the IT policy module 146 to modify the configuration of the device 100. Alternatively, in some cases, the IT policy update can also be done over a wired connection.

Other types of software applications can also be installed on the communication device 100. These software applications can be third party applications, which are added after the manufacture of the communication device 100. Examples of third party applications include games, calculators, utilities, etc.

The additional applications can be loaded onto the communication device 100 through at least one of the wireless network 200, the auxiliary I/O subsystem 112, the data port 114, the short-range communications subsystem 122, or any other suitable device subsystem 124. This flexibility in application installation increases the functionality of the communication device 100 and can provide enhanced on-device functions, communication-related functions, or both. For example, secure communication applications can enable electronic commerce functions and other such financial transactions to be performed using the communication device 100.

The data port 114 enables a subscriber to set preferences through an external device or software application and extends the capabilities of the communication device 100 by providing for information or software downloads to the communication device 100 other than through a wireless communication network. The alternate download path can, for example, be used to load an encryption key onto the communication device 100 through a direct and thus reliable and trusted connection to provide secure device communication. The data port 114 can be any suitable port that enables data communication between the communication device 100 and another computing device. The data port 114 can be a serial or a parallel port. In some instances, the data port 114 can be a USB port that includes data lines for data transfer and a supply line that can provide a charging current to charge the battery 130 of the communication device 100.

The short-range communications subsystem 122 provides for communication between the communication device 100 and different systems or devices, without the use of the wireless network 200. For example, the subsystem 122 can include an infrared device and associated circuits and components for short-range communication. Examples of short-range communication standards include standards developed by the Infrared Data Association (IrDA), Bluetooth™, and the 802.11™ family of standards.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touchscreen, mouse, track ball, infrared fingerprint detector, or a roller wheel with dynamic button pressing capability. The keyboard 116 may be an alphanumeric keyboard and/or telephone-type keypad. However, other types of keyboards can also be used. A composed item can be transmitted over the wireless network 200 through the communication subsystem 104. It will be appreciated that if the display 110 comprises a touchscreen, then the auxiliary subsystem 112 may still comprise one or more of the devices identified above.

For voice communications, the overall operation of the communication device 100 is substantially similar, except that the received signals are output to the speaker 118, and signals for transmission are generated by the microphone 120. Alternative voice or audio I/O subsystems, such as a voice message recording subsystem, can also be implemented on the communication device 100. Although voice or audio signal output is accomplished primarily through the speaker 118, the display 110 can also be used to provide additional information such as the identity of a calling party, duration of a voice call, or other voice call related information.

FIG. 2 shows an exemplary block diagram of the communication subsystem component 104. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the communication device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the communication device 100 and the wireless network 200 can contain one or more different channels, typically different RF channels, and associated protocols used between the communication device 100 and the wireless network 200. An RF channel is a limited resource that should be conserved, typically due to limits in overall bandwidth and limited battery power of the communication device 100. When the communication device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

FIG. 3 is a block diagram of an exemplary implementation of a node 202 of the wireless network 200. In practice, the wireless network 200 comprises one or more nodes 202. In conjunction with the connect module 144, the communication device 100 can communicate with the node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the communication device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the communication device 100 in accordance with particular, usually predetermined, communication protocols and parameters, under control of its controller. The fixed transceiver equipment similarly demodulates and possibly decodes and decrypts, if necessary, any communication signals received from the communication device 100 within its cell. Communication protocols and parameters can vary between different nodes. For example, one node can employ a different modulation scheme and operate at different frequencies than other nodes.

For all communication devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each communication device 100. The SGSN 216 also performs security functions and access control for data traffic on the wireless network 200. The GGSN 218 provides internetworking connections with external packet switched networks and connects to one or more SGSNs 216 via an Internet Protocol (IP) backbone network operated within the network 200. During normal operations, a given communication device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a communication device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each communication device 100 must be assigned to one or more APNs and communication devices 100 cannot exchange data without first performing a GPRS Attach to an APN that it has been authorized to use. The APN can be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a communication device 100 is not using its PDP Context, the PDP Context can be de-allocated and the IP address returned to the IP address pool managed by the DHCP server 220.

FIG. 4 is a block diagram illustrating components of an exemplary configuration of a host system 250 with which the communication device 100 can communicate in conjunction with the connect module 144. The host system 250 will typically be a corporate enterprise or other local area network (LAN), but can also be a home office computer or some other private system, for example, in variant implementations. In the example shown in FIG. 4, the host system 250 is depicted as a LAN of an organization to which a user of the communication device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's communication device 100 is situated on a LAN connection. The cradle 264 for the communication device 100 can be coupled to the computer 262*a* by a serial or a Universal Serial Bus (USB) connection, for example. Other user computers 262*b*-262*n* are also situated on the network 260, and each can be equipped with an accompanying cradle 264. The cradle 264 facilitates the loading of information (e.g. PIM data, private symmetric encryption keys to facilitate secure communications) from the user computer 262*a* to the communication device 100, and can be particularly useful for bulk information updates often performed in initializing the communication device 100 for use. The information downloaded to the communication device 100 can include certificates used in the exchange of messages.

It will be understood by persons skilled in the art that the user computers 262*a*-262*n* are typically also connected to other peripheral devices, such as printers, etc., which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 can represent a smaller part of a larger network (not shown) of the organization, and can comprise different components and/or be arranged in different topologies than that shown in the exemplary embodiment of FIG. 4.

To facilitate the operation of the communication device 100 and the wireless communication of messages and message-related data between the communication device 100 and components of the host system 250, a number of wireless communication support components 270 can be provided. In some implementations, the wireless communication support components 270 can include a message management server 272, a mobile data server 274, a web server, such as Hypertext Transfer Protocol (HTTP) server 275, a contact server 276, and a device manager module 278. HTTP servers can also be located outside the enterprise system, as indicated by the HTTP server 279 attached to the network 224. The device manager module 278 includes an IT Policy editor 280 and an IT user property editor 282, as well as other software components for allowing an IT administrator to configure the communication devices 100. In an alternative embodiment, there can be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the communication devices 100. The memory unit 292 can store functions used in implementing the IT policy as well as related data. Those skilled in the art know how to implement these various components. Other components can also be included as is well known to those skilled in the art. Further, in some implementations, the data store 284 can be part of any one of the servers.

In this exemplary embodiment, the communication device 100 communicates with the host system 250 through node 202 of the wireless network 200 and a shared network infrastructure 224 such as a service provider network or the public Internet. Access to the host system 250 can be provided through one or more routers (not shown), and computing devices of the host system 250 can operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the communication device 100. The wireless VPN router allows a VPN connection to be established directly through a specific wireless network to the communication device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection may be a Transmission Control Protocol (TCP)/IP or User Datagram Protocol (UDP)/IP connection for delivering the messages directly to the communication device 100 in this alternative implementation.

Messages intended for a user of the communication device 100 are initially received by a message server 268 of the host system 250. Such messages can originate from any number of sources. For instance, a message can have been sent by a sender from the computer 262*b* within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 can comprise multiple message servers 268. The message server 268 can also be adapted to provide additional functions beyond message management, including the management of data associated with calendars and task lists, for example.

When messages are received by the message server 268, they are typically stored in a data store associated with the message server 268. In at least some embodiments, the data store can be a separate hardware unit, such as data store 284, with which the message server 268 communicates. Messages can be subsequently retrieved and delivered to users by accessing the message server 268. For instance, an e-mail client application operating on a user's computer 262*a* can request the e-mail messages associated with that user's account stored on the data store associated with the message server 268. These messages are then retrieved from the data store and stored locally on the computer 262*a*. The data store associated with the message server 268 can store copies of each message that is locally stored on the communication device 100. Alternatively, the data store associated with the message server 268 can store all of the messages for the user of the communication device 100 and only a smaller number of messages can be stored on the communication device 100 to conserve memory. For instance, the most recent messages (i.e. those received in the past two to three months for example) can be stored on the communication device 100.

When operating the communication device 100, the user may wish to have e-mail messages retrieved for delivery to the communication device 100. The message application 138 operating on the communication device 100 can also request messages associated with the user's account from the message server 268. The message application 138 can be configured (either by the user or by an administrator, possibly in accordance with an organization's IT policy) to make this request at the direction of the user, at some pre-defined time interval, or upon the occurrence of some pre-defined event. In some implementations, the communication device 100 is assigned its own e-mail address, and messages addressed specifically to the communication device 100 are automatically redirected to the communication device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the communication device 100. The message management server 272 also facilitates the handling of messages composed on the communication device 100, which are sent to the message server 268 for subsequent delivery.

For example, the message management server 272 can monitor the user's "mailbox" (e.g. the message store associated with the user's account on the message server 268) for new e-mail messages, and apply user-definable filters to new messages to determine if and how the messages are relayed to the user's communication device 100. The message management server 272 can also, through an encoder (not shown) associated therewith, compress message data, using any suitable compression/decompression technology (e.g. YK compression, JPEG, MPEG-x, H.26x, and other known techniques) and encrypt messages (e.g. using an encryption technique such as Data Encryption Standard (DES), Triple DES, or Advanced Encryption Standard (AES)), and push them to the communication device 100 via the shared network infrastructure 224 and the wireless network 200. The message management server 272 can also receive messages composed on the communication device 100 (e.g. encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the communication device 100 can be defined (e.g. by an administrator in accordance with IT policy) and enforced by the message management server 272. These may include whether the communication device 100 can receive encrypted and/or signed messages, minimum encryption key sizes, whether outgoing messages must be encrypted and/or signed, and whether copies of all secure messages sent from the communication device 100 are to be sent to a pre-defined copy address, for example.

The message management server 272 can also be adapted to provide other control functions, such as only pushing certain message information or pre-defined portions (e.g. "blocks") of a message stored on the message server 268 to the communication device 100. For example, in some cases, when a message is initially retrieved by the communication device 100 from the message server 268, the message management server 272 can push only the first part of a message to the communication device 100, with the part being of a pre-defined size (e.g. 2 KB). The user can then request that more of the message be delivered in similar-sized blocks by the message management server 272 to the communication device 100, possibly up to a maximum pre-defined message size. Accordingly, the message management server 272 facilitates better control over the type of data and the amount of data that is communicated to the communication device 100, and can help to minimize potential waste of bandwidth or other resources.

The mobile data server 274 encompasses any other server that stores information that is relevant to the corporation. The mobile data server 274 can include, but is not limited to, databases, online data document repositories, customer relationship management (CRM) systems, or enterprise resource planning (ERP) applications. The mobile data server 274 can also connect to the Internet or other public network, through HTTP server 275 or other suitable web server such as a File Transfer Protocol (FTP) server, to retrieve HTTP webpages and other data. Requests for webpages are typically routed through mobile data server 274 and then to HTTP server 275, through suitable firewalls and other protective mechanisms. The web server then retrieves the webpage over the Internet, and returns it to mobile data server 274. As described above in relation to message management server 272, mobile data server 274 is typically provided, or associated, with an encoder 277 that permits retrieved data, such as retrieved webpages, to be decompressed and compressed, using any suitable compression technology (e.g. YK compression, JPEG, MPEG-x, H.26x and other known techniques), and encrypted (e.g. using an encryption technique such as DES, Triple DES, or AES), and then pushed to the communication device 100 via the shared network infrastructure 224 and the wireless network 200. While encoder 277 is only shown for mobile data server 274, it will be appreciated that each of message server 268, message management server 272, and HTTP servers 275 and 279 can also have an encoder associated therewith.

The contact server 276 can provide information for a list of contacts for the user in a similar fashion as the address book on the communication device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the HTTP server 275, the contact server 276, the device manager module 278, the data store 284 and the IT policy server 286 do not need to be implemented on separate physical servers within the host system 250. For example, some or all of the functions associated with the message management server 272 can be integrated with the message server 268, or some other server in the host system 250. Alternatively, the host system 250 can comprise multiple message management servers 272, particularly in variant implementations where a large number of mobile devices need to be supported.

The device manager module 278 provides an IT administrator with a graphical user interface with which the IT administrator interacts to configure various settings for the communication devices 100. As mentioned, the IT administrator can use IT policy rules to define behaviors of certain applications on the communication device 100 that are permitted such as phone, web browser or Instant Messenger use. The IT policy rules can also be used to set specific values for configuration settings that an organization requires on the communication devices 100 such as auto signature text, WLAN/VoIP/VPN configuration, security requirements (e.g. encryption algorithms, password rules, etc.), specifying themes or applications that are allowed to run on the communication device 100, and the like.

The communication device 100 may be provisioned with a number of messaging services and applications. A messaging service can be associated with an enterprise account at the message server 268 described above. The aforementioned message application 138 may be employed to manage a local e-mail store including redirected messages received from the message server 268. Other messaging services may be provided using the same data service providing e-mail connectivity, a different data service, or a voice-centric service to provide messaging services in different formats, or with multiple messaging services providing messages in the same format. For example, the communication device may be provisioned to receive and transmit messages over a wireless network both via an associated enterprise system as well as a third party service provider.

The various message and content services mentioned above may be discovered and provisioned or registered at the device using a number of techniques that will be known to those skilled in the art. Two possible techniques for provisioning or registering a service at the communication device 100 are injection of a service record pertaining to the service at the device and registration using an API. As a non-limiting example of service record injection, a request for registration may be sent from the communication device 100 to a registration server of a service provider. If the request is approved, the registration server may transmit to the communication device 100 a service book containing data and instructions to enable the communication device 100 to provision the service. The service book, when received at the communication device 100, may be self-executing, and may permit the user to enter account information relevant to the associated service. This information is stored in a service record at the device 100. The service book may store several service records, each corresponding to a messaging service provisioned for the device 100. User account can also be transmitted from the communication device 100 to a provisioning server of the service provider, which can create a new primary service account for the user, or else associate the transmitted information with an existing account for the user. Thus, if the communication device 100 is provisioned for a message service provided by the message server 238, the primary service account is created at the message server 238. The service may comprise both a primary service account and an associated service account; for example, while a primary service account may provide e-mail service for the user, an associated service account provided by either the primary service provider or an associated service provider may handle the forwarding or redirection of messages from the primary service account to the communication device 100. In other variants, the provisioning process may be managed by a communications carrier via a carrier provisioning server which provides a front-end system for a value-added service provided by the service provider.

Not all message or content services need be provisioned by adding or injecting records into a service book or a similar service data repository. As another example, applications installed by the user or an administrator may register or deregister with management module such as an API provided at the device. Registration with the API provides the application with access to other functions and features of the device operating system 134, including management and storage of folders and other data structures containing application-related data (such as messages and other content), as well as eligibility of application-related messages and content for inclusion in a unified inbox listing of messages in multiple formats, as discussed below. Messages received at the communication device 100 can be stored in distinct data stores, folders or files at the device 100, together with messages generated at the device 100 for transmission via an associated service. For example, each message item received or generated at the device 100 may be stored as a separate message object in a data store associated with its corresponding service or application, and can be retrievable for presentation to the user using a dedicated application executing at the device 100 and associated with that particular message format. In addition, the objects may be indexed for searching on the device 100 either through the dedicated application itself or through a unified search process implemented in the device operating system 134, and retrievable for presentation in one or more inboxes displayable at the device 100. Messages received and transmitted using a particular service or a particular account provisioned at the device may be presented in a separate inbox dedicated to that message service or account. Alternatively or additionally, the messages from multiple services or accounts can be viewed using a unified inbox. The unified inbox may be defined conceptually or visually to the user as a message inbox having characteristics similar to those employed in respect of mail clients known in the art, but it will be appreciated by those skilled in the art that the "unified inbox", as referred to herein, need not be limited strictly to such an implementation. The unified inbox may also be considered as a global message or content list, or as a unified view of message or other content information that serves as an entry point for access to a service or application executable on the device. When the unified inbox is invoked, message objects may be retrieved by a collector process from one or more data stores or folders correspondingly associated with one or more messaging accounts and available to the device 100 for presentation in a unified inbox display. The message elements displayed in the unified inbox display may include, in the case of messages such as e-mail, header data such as sender, timestamp, and subject line. In addition, or alternatively, at least a portion of the message body content may also be displayed. In the case of other message types, such as instant messages, the information displayed may include message body content in place of message header content. The methods and systems described below may apply to both separate and unified inboxes.

Turning to FIG. 5, a typical message inbox view or user interface 500 is shown displayed on the display 110 of the communication device 100. For simplicity, features of the user interface normally displayed on the communication device 100 and user interface subsystems 112 and other components, such as a keyboard 116, have been omitted from the figures. It will be appreciated by those skilled in the art that the user interface 500 may be provided with banner displays conveying additional information to the user, such as the status of a network connection or the current network time, and with additional user interface elements 500 such as menu options or virtual buttons for invoking operating system- or application-specific commands, such as closing the messaging application displaying the message inbox view, switching to a different application, deleting, replying to, or forwarding a message, and the like.

The user interface 500 provides a listing of messages in a unified or single-account inbox on the device 100. In this example, the listing includes e-mail messages 505, 515 received via an e-mail transport and SMS or other network messages such as instant messages 510 received over a different message transport. As can be seen from the example of FIG. 5, three network messages 510 apparently pertain to the same conversation, as they have the same subject line 512; further, the two e-mail messages indicated at 515 apparently pertain to the same conversation, as they have similar although not identical subject lines 517, 519. The message types may be distinguished by icons 511, 516, 518 displayed adjacent to each listed message. However, because the messages are displayed in the user interface 500 in reverse chronological order, the related messages are not necessarily displayed in a block or together in a visual manner that allows the user of the communication device 100 to ascertain that he or she has read all of the messages in that conversation. For example, the conversation represented by the set of network messages 510 may include other related messages that are not shown in the user interface 500 due to constraints on available display area for the user interface 500.

Figure 6C:
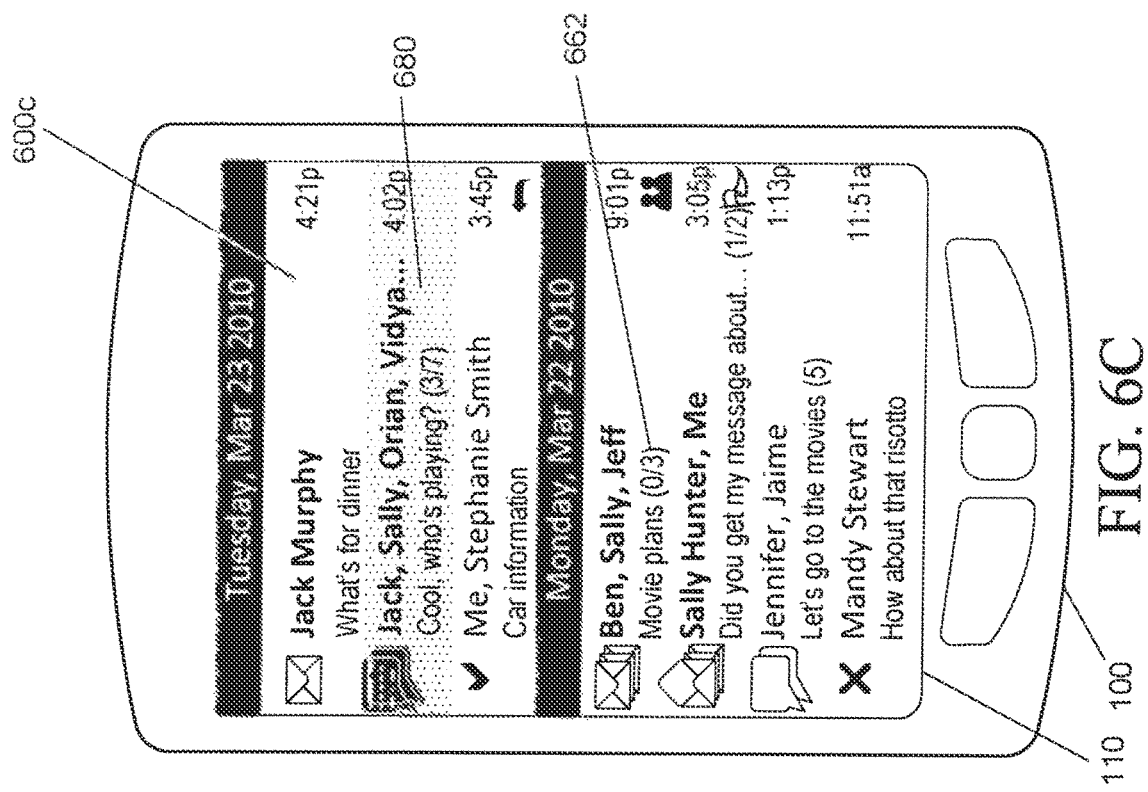

Accordingly, FIG. 6A illustrates a first user interface 600*a* providing for displaying the messages in the communication device inbox by grouping like messages. In the examples illustrated herein, the groupings are presented in reverse chronological order, although messages and groupings may be presented in other orders, such as chronological order, alphabetical order by sender, recipient, or subject line, priority order, or other orders defined by message body or header content. Rather than displaying three separate listings for three network messages 510 in FIG. 5, the user interface 600a represents the network messages having the same subject in a single grouping 610. Similarly, instead of displaying each of e-mail messages 515 in separate entries as in FIG. 5, the user interface 600a of FIG. 6A groups these messages together in a single group listing 615. Thus, additional display space in the user interface 600a may be used to list other messages or groups of messages 620, 622, 624 that would not have otherwise been visible in the user interface 500 of FIG. 5. This increased efficiency in the message listing display may reduce the need on the part of the user to invoke a user input mechanism, such as a trackball, trackpad, touchscreen, optical joystick, and the like, to scroll through the message listing displayed in the interface 600a to locate a related message that may not have been readily visible in the message listing in the first user interface 500. In addition, the grouping of messages in this manner may also reduce the need to invoke a search function on the device 100 to locate an older message in a grouping that might not have been readily visible in the message listing of FIG. 5, thus reducing processor and power usage at the device 100. The grouping of messages is discussed in further detail with reference to FIG. 10, below.

The user interface 600a may include messages that are not displayed as part of a group; for example, the message listing 605 represents a single e-mail, since it is not associated with any other messages through a common subject line. The grouped and single messages may be listed in the user interface 600a in chronological or reverse chronological order. Group listings may be included in the chronological or reverse chronological order based on the timestamp of the most recent message in the group. Thus, for example, the first message group 610 listed in the user interface 600a is listed according to the timestamp 613 of the most recently received message, which can be seen by a comparison to the user interface of FIG. 5.

To differentiate message groups from single messages, different icons may be used to provide a visual indicator of the type of listing. For example, referring to FIG. 5, a single balloon icon 511 may represent a single network message; a group of network messages is represented in FIG. 6A as a cluster of balloons 617. Similarly, a single e-mail message may be represented by a single envelope icon 516, as shown in FIG. 5, whereas a group of e-mail messages may be represented by a cluster of envelopes 616 as shown in FIG. 6A. Further, groups of messages may be distinguishable from other single messages in the same user interface by listing the participants in the group's messages. For example, single e-mail messages may be identified in a message listing by the sender or recipient's common name ("friendly" name) or e-mail address, if no common name is available. The messages 515 in FIG. 5 are identified by the sender or recipient's friendly name. If the messages are grouped, they may be identified by a list of the participants' friendly names, and optionally only by the participants' first name, if available, as shown in the group listing 615 in FIG. 6A. Further, unlike the subject lines 517, 519 shown in FIG. 5, the subject line associated with a message group entry 619 may omit common prefixes that may have been used in the individual messages, as discussed below.

Figure 6B:
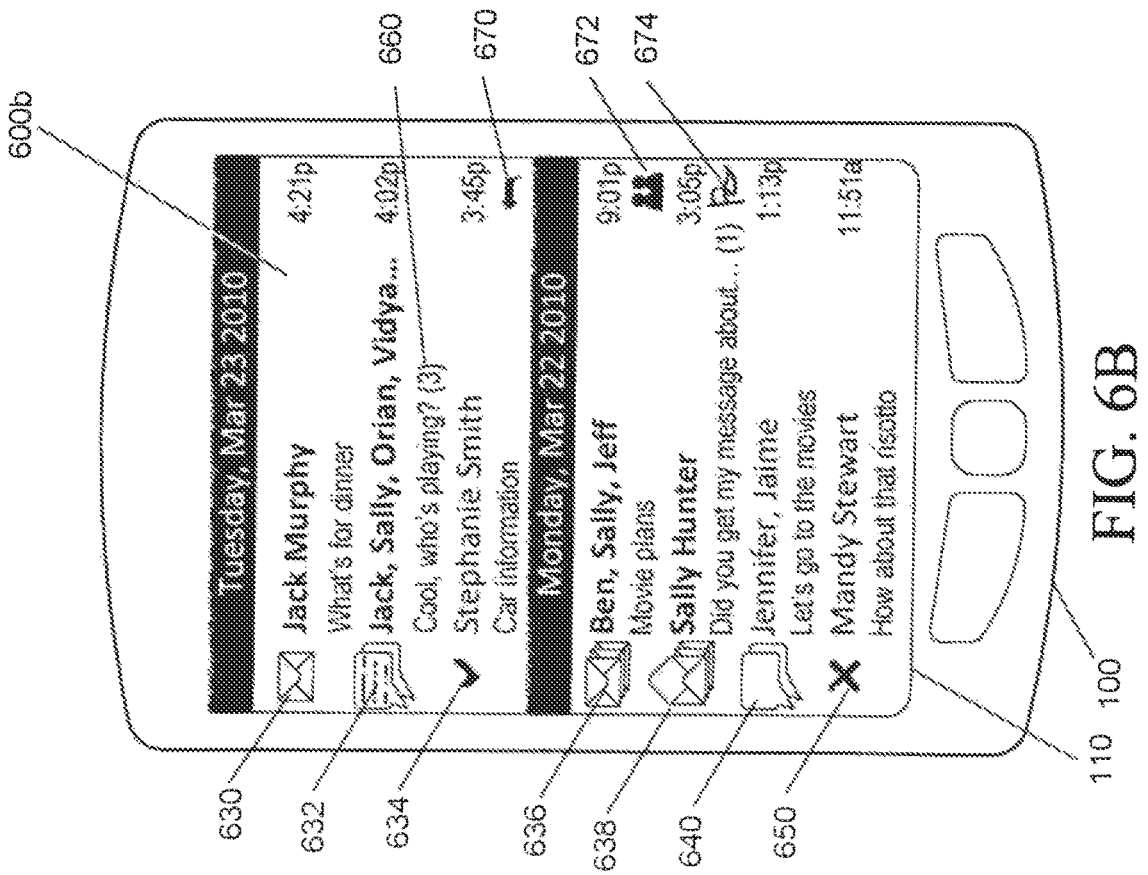

A further example of a user interface 600b listing message groups is shown in FIG. 6B. As with the example of FIG. 6A, each listing in the user interface 600b, whether representative of a single message or a group of messages, may be indicated by an icon 630 through 650. These icons generally reflect a state of the individual message or group, and are referred to below as "primary" icons. In addition, messages or message groups may also include secondary icons or indicators such as the secondary icons 670, 672 and 674. In the examples herein, the single closed envelope icon 630 generally represents a message that was received but has not been marked read; the cluster of balloons including markings 632 may represent a group of network messages, including at least one message that is unread; a checkmark 634 may represent a message that was successfully transmitted from the communication device 100; a cluster of unread envelopes 636 may represent a group of messages, none of which have been marked read; a cluster of envelopes including a top envelope that is opened 638 may represent a message group in which at least the most recent message has been read; a cluster of blank balloons 640 may represent a group of network messages, all of which have been marked read; and an "x" 650 may indicate a message that was not transmitted from the communication device due to a device or network failure. The primary icons may include other variants to indicate a status or characteristic of the message or message group. For example, a primary icon overlaid with a left-pointing arrow or a right-pointing arrow denotes that the message or group represented by the icon comprises a reply to an earlier message or forwards an earlier message, respectively. If the primary icon represents a single message, then a left- or right-pointing arrow may indicate that this message is a reply to a parent message, or forwards a parent message. If the primary icon represents a message group, the left- or right-pointing arrow may indicate that the most recent action at the communication device 100 was a response to or forwarding of, respectively, a most recently received message within that group.

While primary icons or indicators may identify a general state of the message or group, secondary icons or indicators may provide further detail about the message or group. For example, instead of providing the left and right arrows on the primary icons, as described above, a secondary icon comprising a left arrow 670 may indicate that the user's last action in respect of that message or group was a reply to a previous message, and a secondary icon comprising a right arrow may indicate that the user's last action was to forward a previous message; a calendar page 672 may indicate that the message or group contains a meeting invitation or other calendar event attachment; and a flag 674 may indicate that the individual message was flagged by the sender or recipient, or that the message group contains a message that was flagged. Inclusion of these secondary indicators, in addition to the primary icon representing the message group's status, provides a readily visible reference for the user to locate special content, such as a calendar event attachment, again without invoking a search function, or without invoking a separate application such as a calendar application. The foregoing examples of primary and secondary icons should be understood to be non-exhaustive.

Additional information regarding unread messages may also be provided in the user interface. In the user interface 600b, a message group entry may include a message count indicator 660, which in the example of 600b indicates the number of unread messages within the group. In an alternative embodiment, not shown, the count indicator may indicate the total number of messages within the group. In a further example, the message count indicator may include a count of both unread messages and total messages in the group, as shown at 662 in the user interface 600c of FIG. 6C.

For example, "(0/3)" may represent that zero out of the three messages of the group have been marked read on the device, where as "(5)" may represent that the group has five messages, all of them marked read. Further, the user interface 600c may be configured to highlight listings that are new since the last time either the user interface 600c or a given message group was viewed, or in which one or more messages are marked unread or unopened. All or part of the text of the listing may be shown in boldface, such as the message listings 605, 610 in FIG. 6A, or in a different font face, or alternatively the listing may be visually demarcated. For example, message group entry 680 is shown highlighted in a different shade than the other listings on the user interface 600c, indicating that there was recent activity in the messages associated with the group (e.g., a newly received and unread message) since the last time the messages in that group were viewed on the device 100.

As discussed above, the primary icons provide information about the general state of an individual message or message group entry. A non-exhaustive list of primary and secondary icons is provided in the tables of FIGS. 7A, 7B and 7C. As shown in FIG. 7A, an unread ("unopened"), single message such as an e-mail message may be represented in the user interface 600a, 600b, 600c by a single closed envelope icon 702, 704. A single message that is marked read ("opened") may be represented by a single open envelope icon 720. If colour is a feature of the user interface 600a, 600b, 600c, then the closed envelope icon may be further differentiated from the open envelope icon by colour 720; for example, the open envelope icon 720 may be white, while the closed envelope icon is shaded, as illustrated by closed envelope icon 702. Colour may also be used to differentiate between messages that are marked as both new and unread and messages that are not new, but also marked unread (for example, a new message that has been read or opened is no longer flagged as "new" in a message inbox, but it may then be subsequently marked unread or unopened, although it is no longer new).

Further, in a given message group or thread, there may be a variety of read/unread states. A single message that has been read or marked opened, or a thread or group comprising such a single message, can be denoted by an icon such as the open envelope icon 720. For example, all messages in a group may be unread, and therefore the group may be indicated by a cluster or stack of closed envelopes 706, 708, 710. A stack of two envelopes 706, 708 may be sufficient to convey to the user that there are multiple messages in a group or thread. Examples in the accompanying figures include stacks of two or three envelopes. If colour is a feature of the user interface, then the colour of the cluster of envelopes may differ from that of an open envelope icon. An example of this icon is also shown at 802 in the user interface 800a shown in FIG. 8A. If all messages in a group have been marked read, then the group of messages may be indicated by an icon consisting of a cluster of open envelopes, or a cluster of envelopes in the same colour as the single open envelope icon, optionally topped with an open envelope, as shown at 722 in the table of FIG. 7A and at 804 in FIG. 8A. If, however, some messages in a message group have been marked read, while others have not, the appearance of the icon or other indicator may vary according to the read or unread status of other messages in the group, as shown in the table of FIG. 7A. If the most recent message in the group has not been marked read, then the message group may be indicated by an icon comprising a cluster of envelopes 712 in which an unopened envelope overlays an open envelope, also shown at 806 in FIG. 8A. In one variant, an unopened envelope overlays and open envelope within a stack of three or more envelopes, as shown by the icon 718. If the most recently received message has been marked read but there still remain unread messages in the group, then the message group may be represented by an icon comprising a cluster of envelopes 714 in which an opened envelope overlays a closed envelope, also shown at 808 in FIG. 8A. In FIG. 8A, the icon 808 is illustrated with inverse shading, since in the user interface 800a the message group entry corresponding to the icon 808 is highlighted. It will be appreciated that icons reflecting similar read/unread states may be used for groups of other types of message formats such as SMS or instant messages.

Other primary icons may be used to visually indicate other current states of single messages or message groups or threads in a message listing. For example, where a single message is in a draft state (i.e., it has been composed at the communication device 100 and saved to local memory, but not yet transmitted), it may be indicated with a draft icon 724. Similarly, a message group including a draft message may be indicated with a draft icon 726 in which a draft message graphic overlays another message or similar image to denote a group of messages. A single message that has been transmitted may be represented by an icon such as the check mark 728, while a message group in which the most recent message of the group was transmitted from the communication device 100 may be represented by a stack of envelopes overlaid by a checkmark as shown in the icon 730. Messages with attachments may be represented by icons such as 732 and 734, which comprise a basic message graphic (as shown in the accompanying figures, an envelope) in combination with an attachment indicator; where a message within a group contains an attachment, the attachment indicator is combined with a stack of envelopes, as shown in icons 736 and 738. Similarly, where a single message is encrypted or digitally signed, or some other form of security is applied to the message, the message may be represented by a basic message graphic in combination with a security indicator, as illustrated by the icons 740 and 742; similar icons 744 and 746, which combine the security indicator with stacked envelopes, can be used for message groups containing a message with security applied. Where a single message comprises a calendar event, such as a meeting invitation, the message can be denoted by a different icon indicative of the invitation, such as the icon 748. A corresponding icon 750 for use in groups containing at least one meeting invitation can include a similar graphic in combination with a stack of messages to indicate that the group contains multiple messages or invitations.

Other primary icons for indicating message and group states are illustrated in FIG. 7B. If a single message is filed in or associated with a folder within the message inbox, the message may be represented by a corresponding icon such as the icon 752. Again, if colour is a component of the icons, the colour of the icon can indicate whether the filed message has been read 752 or unread 754. If a message thread or group comprising multiple messages has been filed in a folder, corresponding icons 758, 760, 762 may be used. If colour is a component of the icons, then the colour can reflect whether one or more of the messages within the group has been read. Thus, for example, if a white or unshaded icon represents a read message, the icon 758, comprising stacked unshaded folders, can represent a filed group of messages in which all messages have been read, while the icon 760, comprising an unshaded folder overlaying a shaded folder, indicates that in the corresponding filed group of messages, a most recent message has been read while at least one earlier message is marked unread or unopened. An icon comprising stacked, shaded folders 562 may represent a filed group of messages in which none are marked read or opened.

Some primary icons may appear only temporarily in a message inbox. For example, when a message composed at the communication device 100 is being transmitted, the icon representing that message may comprise an indicator that its status is undergoing a transition from an unsent (or draft) to a sent message. In FIG. 7B, exemplary icons 764, 766, 768, 770 include a clock graphic. If the message transmission is ultimately successful, the message or the group may be represented by the checkmark icons described above. Alternatively, if transmission fails, a transmission failure icon may be used for that message, such as the icons 772, 774, 776.

The envelope image used in the icons described above is commonly understood in the art to be associated with electronic messages such as e-mail. However, it will be appreciated by those skilled in the art that the icons used to denote various message and message group states need not comprise an envelope graphic such as those illustrated in the accompanying figures.

The icons provide visual indications to the user regarding the state of more than one message within a group listed in the user interface 800a. For example, the icon 806 indicates that a recent message has not been read, and further provides a cue to the user that there may have been a recent development in the conversation represented by that message group. The icon 806, and the icon 808 representing older unread messages in a group in which a more recent message has been read, thus depict multiple message states and provide richer information than a single or monolithic icon representing only the state of a single message within a group. Use of these multi-state icons thus reduces the need for the user to view individual messages within a group or search for messages in order to ascertain their status, resulting in reduced consumption of communication device processing resources. It can be seen from the exemplary icons represented in FIGS. 7A and 7B that a variety of message and message group states can be represented by these multi-state icons, either alone or in combination with additional indicators. As noted above, the icons illustrated in FIGS. 7A and 7B are not exhaustive; other variants may be included which may incorporate shading to represent read and unread states of messages or other additional indicators to represent other message characteristics.

Since a message group may include messages matching more than one additional indicator—for example, in a given group, there may be sent and received messages, unread and read messages, attachments, encryption and so forth—only one primary icon is selected to represent the group according to a priority order based on an expected importance for the user or based on the temporary nature of a current state of the message group. For example, if a message within the group is currently being transmitted, the primary icon for the group will be the transmission icon 768, 770 regardless of the state of the remainder of the messages in the group, since the transmission state is temporary and will end once the message is sent. A next-highest priority icon may be the transmission error icon 776, since it is indicative of a most recent message whose transmission failed and is likely to require the user's attention. Other primary icons that may be selected to represent the message group, in order of priority, may be the draft icon 726, meeting invitation icon 750, sent message icon 730 (only if the most recent message is the sent message), and attachment icon 736, 738. The presence of a draft or a meeting invitation within a message group is presumed to be of greater importance to a user than the existence of an attachment within the message group, since the draft message may be a message the user intends to send, and the meeting invitation may require a response from the user.

In some embodiments, to reduce the number of different primary icons displayable in a user interface, secondary icons may be displayed generally as described above. Examples of possible secondary icons are illustrated in FIG. 7C, such as a draft secondary icon 782; attachment icon 784; security icon 786; calendar event icon 788; folder icon 790; and transmission failure icons 792, 794. Multiple secondary icons may be displayed in association with a given message or message group.

FIGS. 8A through 8H illustrate possible sequences of information flow in a messaging application utilizing message group listings. The user interface 800a of FIG. 8A provides an example of a message listing including message groups and individual messages. The user may use an input device such as a trackball, trackpad, optical joystick, touchscreen or keyboard to select a particular listing in the user interface 800a. As mentioned above, in the example of FIG. 8A one message group entry is highlighted, which may be the effect of user navigation through the user interface 800a. When a message group entry is selected, such as the group represented by the multi-state icon 808 in FIG. 8A, and a command to display the message group listing associated with that message group entry invoked, a message group listing 800b such as that shown in FIG. 8B may be displayed. The message group listing 800b in this example comprises a listing of header information for each message determined to form part of the group, such as the sender or recipient name, together with at least a first line of the body of the message. Since all messages are associated with the group through their common subject line, the subject line of each message need not be displayed; instead, the subject line may be displayed in a banner or other user interface element 812 in the user interface 800b.

Figure 8B:
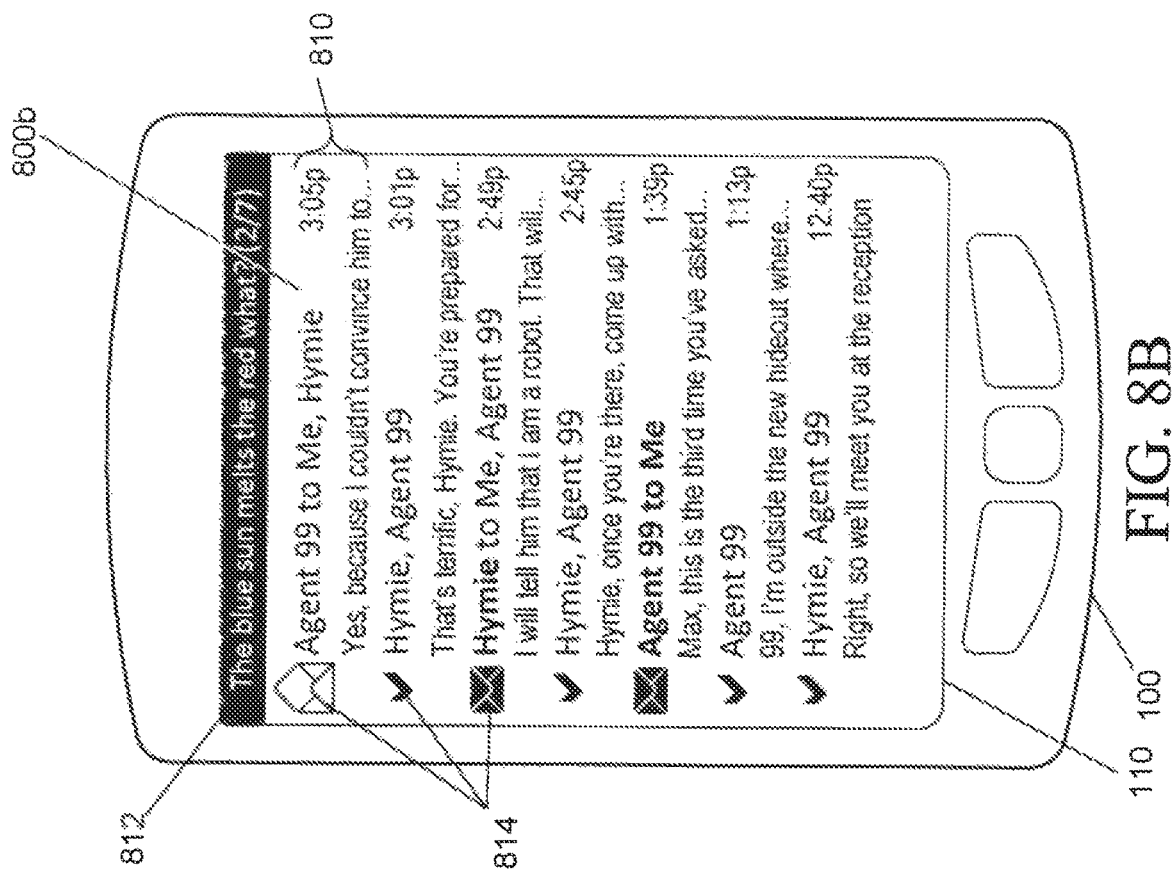
Figure 8A:
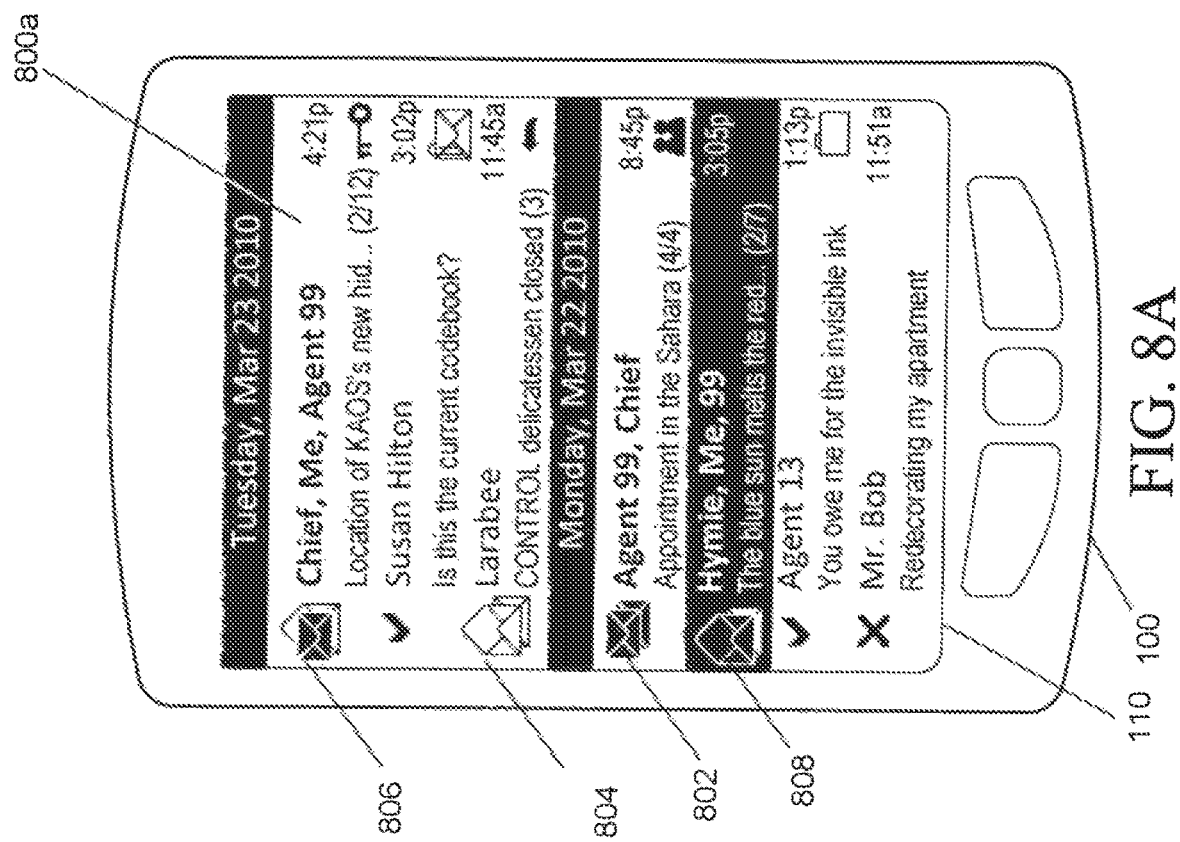

The message group listing in the user interface 800b may be ordered in a predefined order, such as chronological, alphabetical by sender, or in the example of FIG. 8B, in reverse chronological order. Thus, in the listing of FIG. 8B, the first message listed 810 corresponds to the most recent message, whether sent or received, in the group. The user of the communication device 100 may therefore scroll through and select a message listed within the user interface 800b and invoke an instruction to display that selected message on the display 110. If the listing of messages extends beyond the displayable region on the display 110 of the communication device 100, then the remainder of the message group listing may be scrollable using one or more of the various user input subsystems provided on the device 100.

Figure 9A:
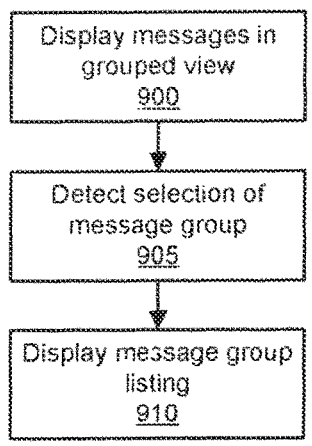
FIGS. 9A through 9D are flowcharts illustrating methods for displaying messages in groups.

The process by which the messages are displayed in this example is illustrated by the flowchart of FIG. 9A. At 900, messages are displayed in a grouped view, which may include a listing of both message groups and individual messages that are not part of a group, as in the example of FIG. 8A. At 905, the communication device 100 detects the selection of a particular message group. At 910, the communication device 100 displays the message group listing, such as that shown in FIG. 8B.

The user interface 800b thus provides an expanded "snapshot" of the state of the message group compared to the user interface 800a, particularly if single or monolithic icons 814 are used to indicate the read or unread state of each individual message within the message group listing. Each of the message listings in the user interface 800b may be selected, and a command invoked to display the message associated with that listing. However, since messages may be grouped by common subject line, not every message within a group need be sent to or received from the same recipients or senders, and the set of messages within a group may in fact represent one or more "conversations" between correspondents. For example, in the course of an electronic message discussion between several participants, a subset of participants may have a separate side discussion, still using the same subject line for their correspondence. It may be desirable in those cases to distinguish those messages from others involving all participants.

Figure 8F:
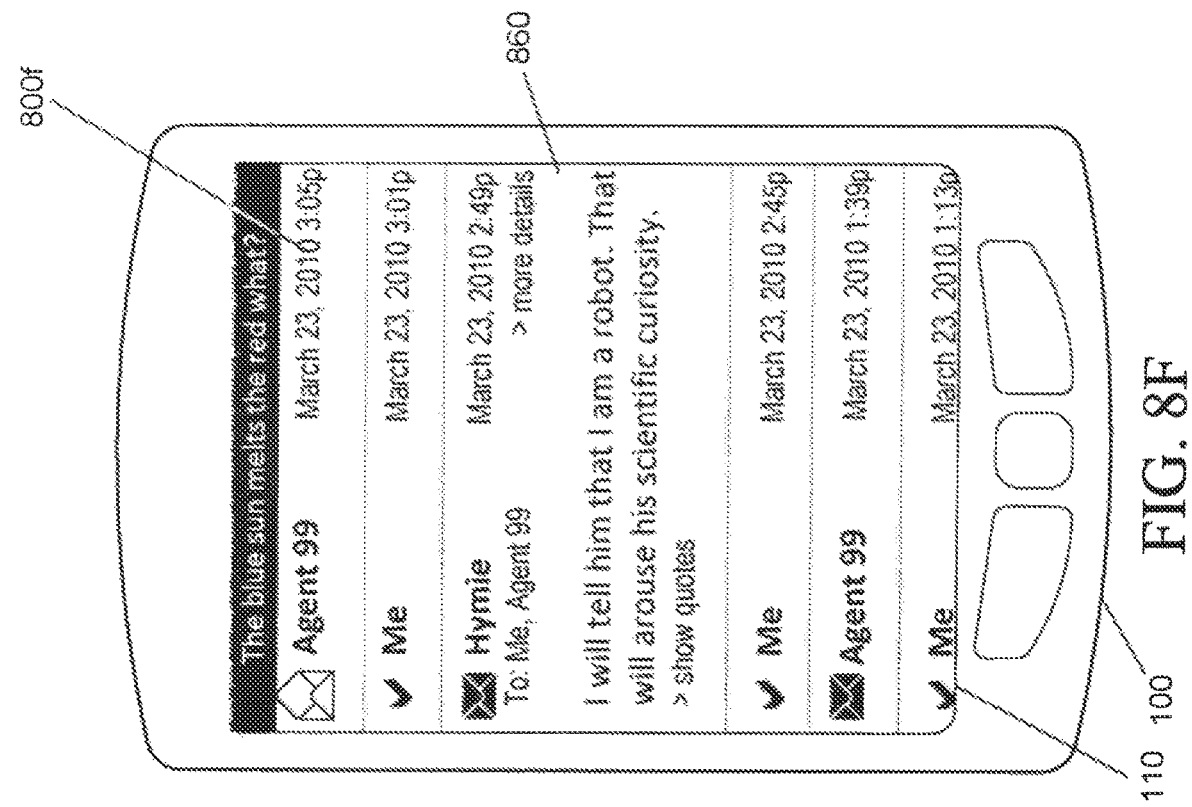
Figure 8E:
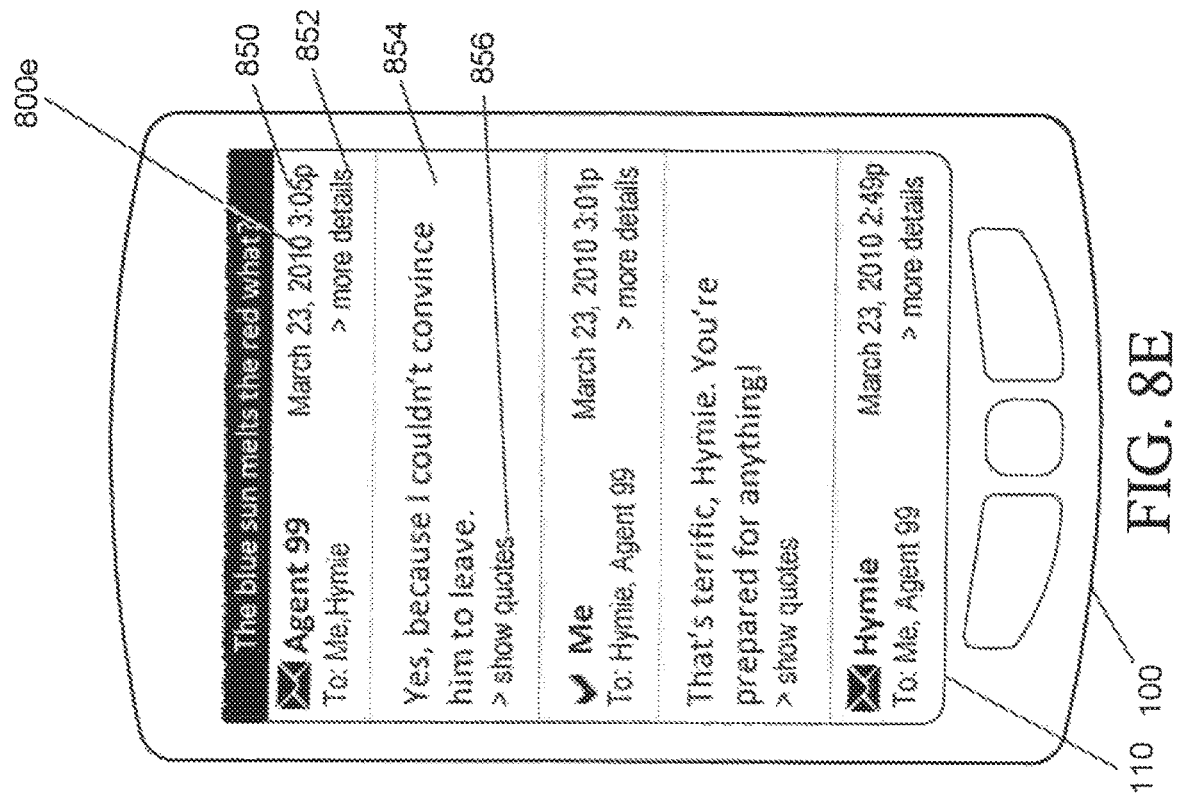
Figure 8D:
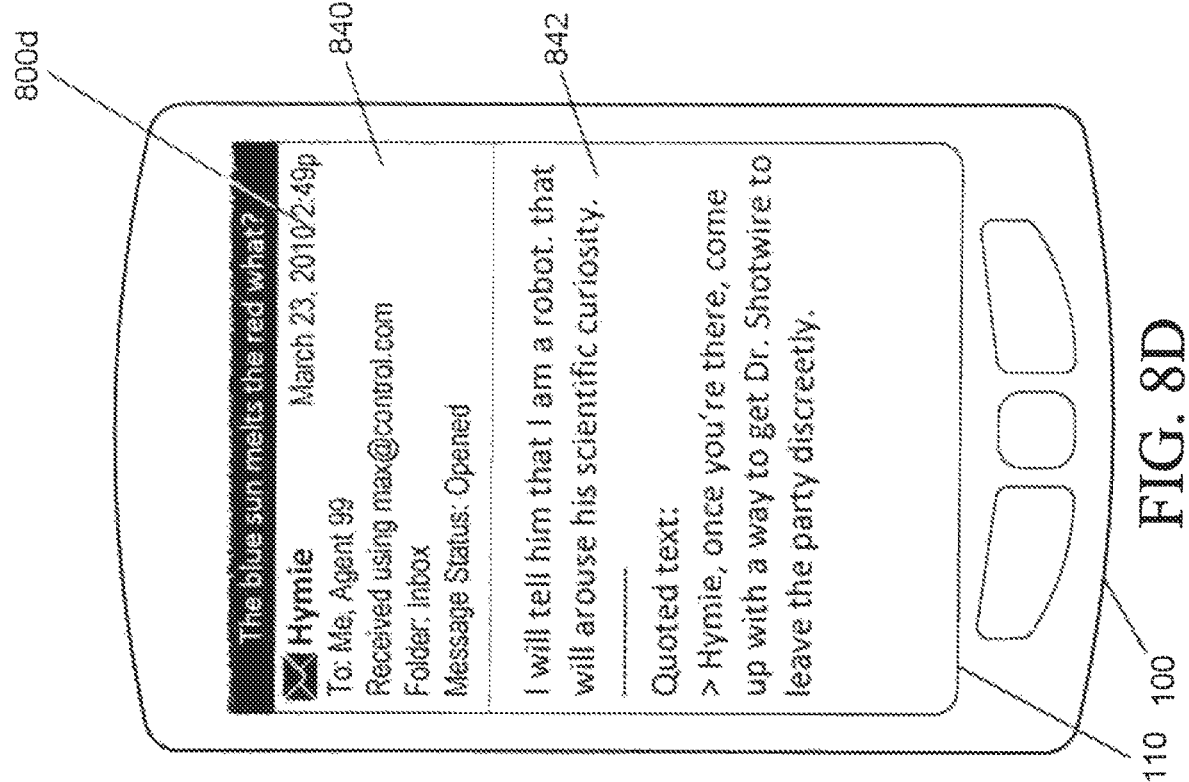
Figure 8C:
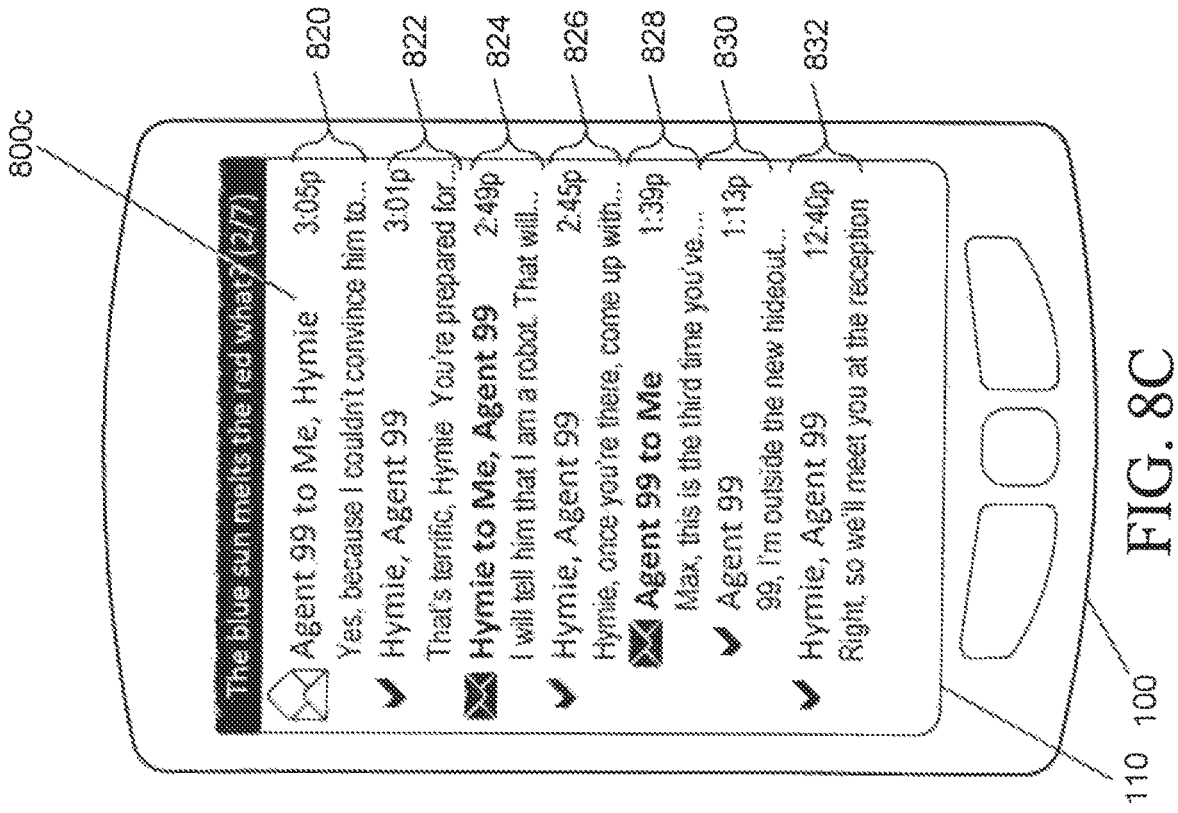

Thus, as shown in the embodiment of FIG. 8C, the user interface 800c containing the message listing for a given group may indent certain messages that are transmitted to or received from a subset of all participants represented in the group. In the user interface 800c, messages 820, 822, 824 and 826 were sent by one of three users ("Agent 99", "Hymie", and "Me", where "Me" is used as a friendly name for the user of the communication device 100) and received by the other two. In this example, these three users represent all participants in this group of messages. The following two messages in reverse chronological order, 828 and 830, were sent and received by only two of the three users, and accordingly may be considered a subset or a "fork" of the conversation among all participants. Therefore, in the user interface 800c of FIG. 8C, these message listings are indented or otherwise visually differentiated from the previous four messages, for example using a different background colour or other visual delineation. The last message listed in the user interface 800c, message 832, was sent or received by all three participants in the message group, and is therefore not indented or visually distinguished.

As noted above, the user may select a message from a message group listing such as the listing of 800b or 800c and invoke an instruction to display the selected message. An example of a displayed message is shown in FIG. 8D, in which the message listed at 832 in FIG. 8C is displayed in an expanded format, with fuller header information 840, which may include additional information about the storage location and status of the message, and the message body 842. In a further embodiment, however, this expanded view of a single message may be automatically invoked when a command to display the message group listing associated with a selected message group entry is received.

Returning to the user interface 800a of FIG. 8A, the message group entry corresponding to the multi-state icon 808 may be selected, and a command invoked to display this message group. The command may be invoked by a keypress on a keyboard, depression of a trackball or button, or by a tap or other gesture on a trackpad or touchscreen. In response to this command, rather than merely displaying a message group listing, the communication device 100 may be configured to display in expanded format either the first message in the message group (which may be the most recently received message, if messages are displayed in reverse chronological order), or the first unread message in the message group. In the example of FIG. 8D, the communication device 100 is configured to display the most recent unread message on the display 110, based on an assumption that if a user invokes a command to view a message group, he or she wishes to view the last unread message in the group. Automatically displaying the first unread message in the group in this manner thus reduces consumption of processing resources, as the intermediate display of the message group listing such as that of FIG. 8B or 8C is bypassed.

Figure 9C:
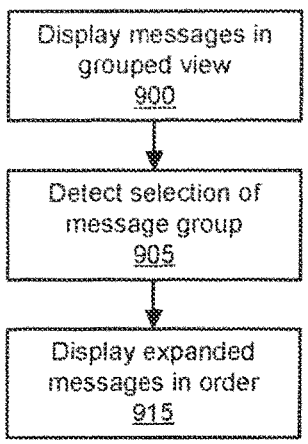
Figure 9D:
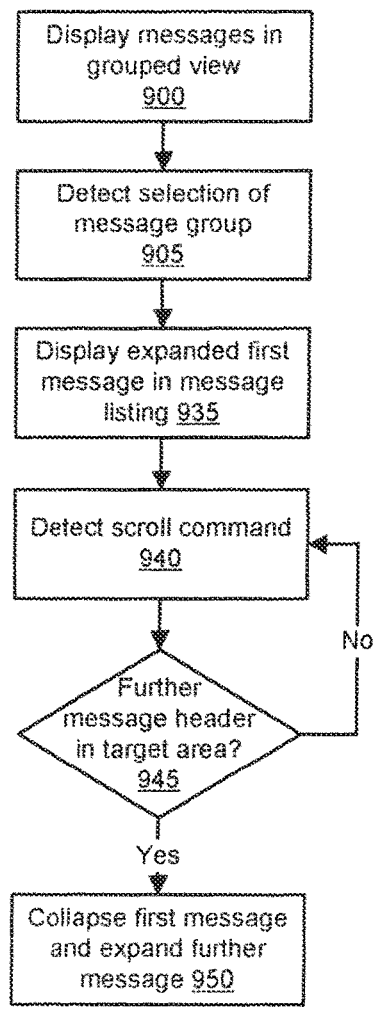
Figure 9B:
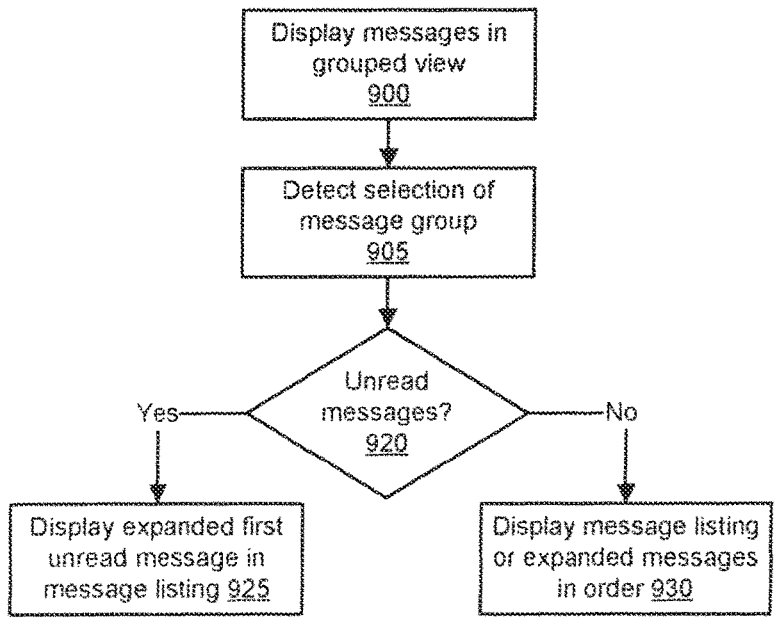

The foregoing method is illustrated in the flowchart of FIG. 9B. At 900, a listing comprising message group entries and individual messages (a "grouped view") is displayed. At 905, a message group entry is selected and a command to view the message group is detected. At 920, a determination is made whether the message group contains unread messages. If the message group contains unread messages, at 925 the communication device 100 displays the first unread message in the user interface in expanded form. If the message group does not contain any unread messages, then at 930 the communication device 100 displays either a message listing, such as that of FIG. 8B or 8C, or an alternate message listing display, such as a display of the first message in the message group in expanded form, or even all messages within the group in an expanded form. An example of a display of all messages of the group in a type of expanded form is shown in FIG. 8E. In this embodiment, all messages in the group are displayed in order in the user interface 800e (in the example of FIG. 8E, in reverse chronological order), but in an intermediate expanded form. Each message is displayed with truncated header information 850, with a user interface element 852 that may be actuated to display additional header information, and with truncated body content that may include at least any new (i.e. not quoted from a previous message) content 854, with a further user interface element 856 actuatable to display additional message content, such as quoted portions of earlier messages. Thus, a further method for displaying message group listings is shown in the flowchart of FIG. 9C. At 900, a listing comprising message group entries and individual messages, or grouped view, is displayed. At 905, a message group entry is selected and a command to view the message group is detected. At 915, the messages are displayed in an expanded format in order, such as in the format illustrated in FIG. 8E.

In still a further embodiment, selection of a given message group entry from the user interface 800a of FIG. 8A and invocation of the command to view the message group listing associated with that message group entry may result in a display of a message listing in which messages are selectively expanded. Turning to FIG. 8F, upon detection of an instruction to display the messages of the group identified by the icon 808 in FIG. 8A, a user interface 800f is displayed which combines the brief message listing of FIG. 8B with the expanded view of FIG. 8E. In the user interface 800f, the messages within the selected group are still displayed in order (in this example, in reverse chronological order), with only the first unread message of the group 860 displayed in the intermediate expanded form illustrated in FIG. 8E. In this view, the relative timing and relevance of the first unread message 860 can be readily perceived by the surrounding message listings. If the user wishes to view other messages listed in the user interface 800f, the other message listings may be selected and actuated to invoke an instruction either to display the message in a fully expanded view such as in FIG. 8D, or in an intermediate expanded view such as the message 860 in FIG. 8F.

The user interfaces 800g, 800h in FIGS. 8G and 8H illustrate still a further method of displaying and navigating through a message group listing. In response to an instruction to display a selected message group listing, the listing may be displayed in an initial state as shown in the user interface 800g, in which the first message in the group 870 is displayed in either a fully expanded or intermediate expanded form, and the following messages in the group 872 through 880 are displayed in a brief form with only partial header information. In response to a scrolling command invoked through actuation of an input device such as a trackball, trackpad, touchscreen, keypad or the like, further messages in the listing are expanded, and the previously expanded message contracted to a brief form, as the further messages are highlighted or selected. In the example of FIG. 8H, as the previously expanded message 870 (shown in FIG. 8G) is scrolled off the display 110, the next message 872' at the top of the display 110 is automatically expanded, while the remaining messages 874 through 880 remain displayed in brief form.

Thus, referring to FIG. 9D, the method of navigation illustrated in FIGS. 8G and 8H may include an initial display of messages in a grouped view 900, as described above; and upon detection of a message group being selected and a command invoked to display the associated message listing at 905, the message listing is displayed with the first message shown in expanded format at 935. At 940, a command to scroll through the messages displayed in the user interface is detected, and as scrolling is carried out in response, a determination is made at 945 whether the message header of another message in the listing has reached a target area of the display 110, such as the top of the display 110. If the further message header has not reached the target area, then the communication device 100 continues to detect scroll commands and to re-evaluate whether a message header has reached the target area. If the further message header has reached the target area, then at 950 the first expanded message is collapsed to a brief format and the further message expanded.

Figure 10:
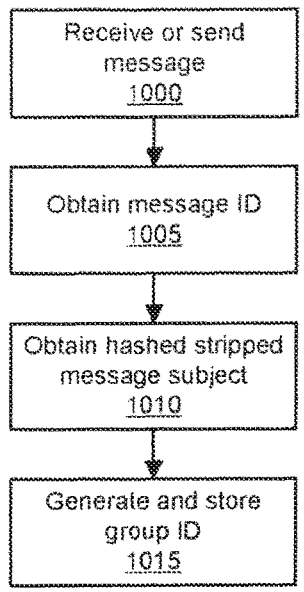
FIG. 10 is a flowchart illustrating a method for assigning group identifiers to messages.

In the embodiments described herein, grouping is carried out based on a common element in the subject line of the messages. The grouping of messages for display in the various interfaces shown in FIGS. 6A through 6C and 8A through 8H is described with reference to the process illustrated in FIGS. 10 to 12. These various processes may be carried out by a conversations manager thread or module executing on the communication device 100, for example in addition to or as part of a messaging application executing on the device 100. Turning first to FIG. 10, when a message is detected 1000 at the communication device 100, which may occur upon receipt of the message at the communication device 100, storage of the message either in draft or final form in an associated message store at the communication device 100, or transmission from the communication device 100, the conversations manager determines a group identifier value for the message. At 1005, the message identifier for the message is obtained. A message identifier may typically be taken from a header identifier value in the message as transmitted or received, such as a message-id value or a timestamp. However, to reduce the possibility that the message identifier for a received message may not be unique for the communication device 100, the message identifier may consist of or include an account identifier value associated with the messaging account used to transmit or receive the message or a value derived therefrom, or another quasi-unique value associated with the communication device 100 or the user account associated with the message. For example, the account identifier value may be a string comprising the messaging address associated with the user's account, a hash thereof, or another value associated with the registration of the account at the communication device 100. Thus, if more than one account is provisioned on the communication device 100, messages having identical subject lines but associated with two different accounts will not be included in the same group.

In addition, a message subject value, derived from subject line content if a subject line exists in the message or comprising a predefined value if no subject line exists for the message format or if the subject line of the message is null, is determined. If a subject line for the particular message format of the message exists, its content is obtained, stripped of prefixes as described below, and hashed to produce a further value at 1010. As will be appreciated by those skilled in the art, hashing the message subject using an appropriate hashing algorithm such as MD5 or SHA-1 will provide an index representing the input subject line, with a low chance of collision with hashes derived from other subject lines; however, other hashing techniques or other techniques for deriving a further value from the message subject may be employed. If the stripped message subject line is empty or if there is no subject line for the message, a predetermined value may be assigned in place of the hash.

The message identifier and the hash value are combined at 1015, such as by concatenation, to produce a message group identifier. This identifier is then stored in association with the message at the communication device 100, for example in the message store at the device 100. The message group identifier may be stored in association with the common subject line for that group of messages, i.e. the subject line, stripped of prefixes as described below.

In a further embodiment, the communication device 100 may be configured to assign a special or predefined group identifier to messages matching predefined filter criteria (for example, messages addressed to or received from specific contacts, and containing predefined strings in the subject line or body) to provide custom groupings of messages. The special group identifier may be defined to include or be derived from a further predefined value to ensure that it does not collide with message group identifiers generated from the account identifier and message subject value. Messages stored at the device, whether received at or transmitted from the device, matching the filter can then be assigned the special group identifier, and displayed as a discrete group or conversation in a message inbox listing such as that shown in FIG. 6A or 8A. The user may thus monitor this specially-defined message grouping for new messages, without having to execute a search each time to locate such messages. The filter may be defined only for messages associated with a specific messaging account, or for messages received or transmitted using a number of accounts or transport methods. In a further embodiment, such messages may be assigned both a special group identifier and a message group identifier as explained above.

Figure 11:
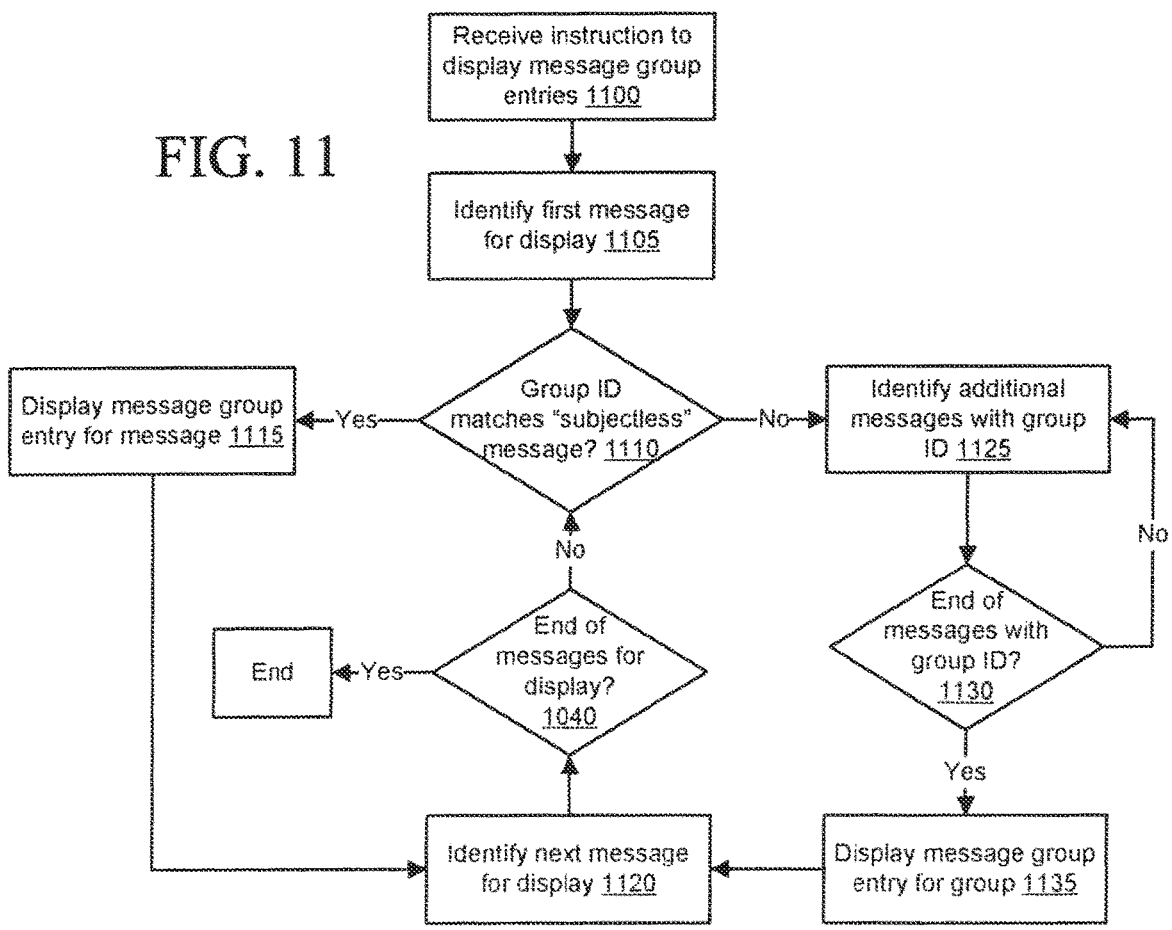
FIG. 11 is a flowchart illustrating a method for displaying message group entries according to their assigned group identifiers.

Subsequently, if an instruction to display a grouped view including message group items, such as in the user interface 800a of FIG. 8A, is received, the communication device 100 may retrieve data for display in the user interface 800a in accordance with the process of FIG. 11. At 1100, the instruction to display a listing including message group entries is received. In response to this instruction, at 1105 the communication device 100 identifies a first message for display. If messages and listings are displayed in reverse chronological order, then the first message may be the message with the most recent timestamp. At 1110 it is determined whether the group identifier associated with this message, which would have been generated and stored previously, matches the group identifier for "subjectless" messages, i.e., those messages which had a blank or null subject line after any prefixes were stripped. If the message had no subject, then it is not grouped with other subjectless messages. Therefore, at 1115, the data required to display the relevant message information in the user interface, such as the sender and recipient identity or identities, and optionally the subject line of the message if available, are retrieved from the message store, and the listing for that message displayed.

If the group identifier is not the identifier associated with subjectless messages, then at 1125 additional messages in the message store associated with the same group identifier are identified. If all messages are determined to have been identified at 1130, then at 1135 the data for the message group item, such as the senders and recipients and common subject line (the subject line with any prefixes stripped off) are retrieved from the message store, and displayed in the user interface. The next message for display in the user interface is then identified at 1120. If it is determined at 1040 that there are further messages that may be listed in the user interface, then the process repeats as described above. If there are no further messages for display, then the process ends. Although the exemplary interface 800a of FIG. 8A depicts a grouped message inbox listing for a single message type of message—namely, e-mail—it will be appreciated that the foregoing process can be applied to a unified inbox view, such as that shown in FIG. 6A, that displays messages for a plurality of user e-mail accounts, or that displays messages for a plurality of different message types. Therefore, at step 1105, the first message for display may be identified either by querying each discrete message store on the device 100 to locate the most recent message (if messages are to be displayed in reverse chronological order) or by executing a search across all searchable message stores on the device 100 to identify the first message for display. At 1120, identification of the next message for display can again be carried out either by querying each discrete message store or by executing a search. The remaining steps of the process may be carried out substantially as described above.

The foregoing system and process of assigning a message group identifier to each message provides an enhanced means of grouping messages for a "conversation" view of messages in either a unified or dedicated message inbox listing. Because this method does not group messages strictly according to subject line content, messages received via different services or accounts that coincidentally have the same subject line will not be grouped together as a single conversation or group. In addition, this method is not reliant on the sending message client incorporating a dedicated thread identifier value to declare the message's membership in a particular group; message groupings are determined only at the communication device 100 instead.

Figure 12:
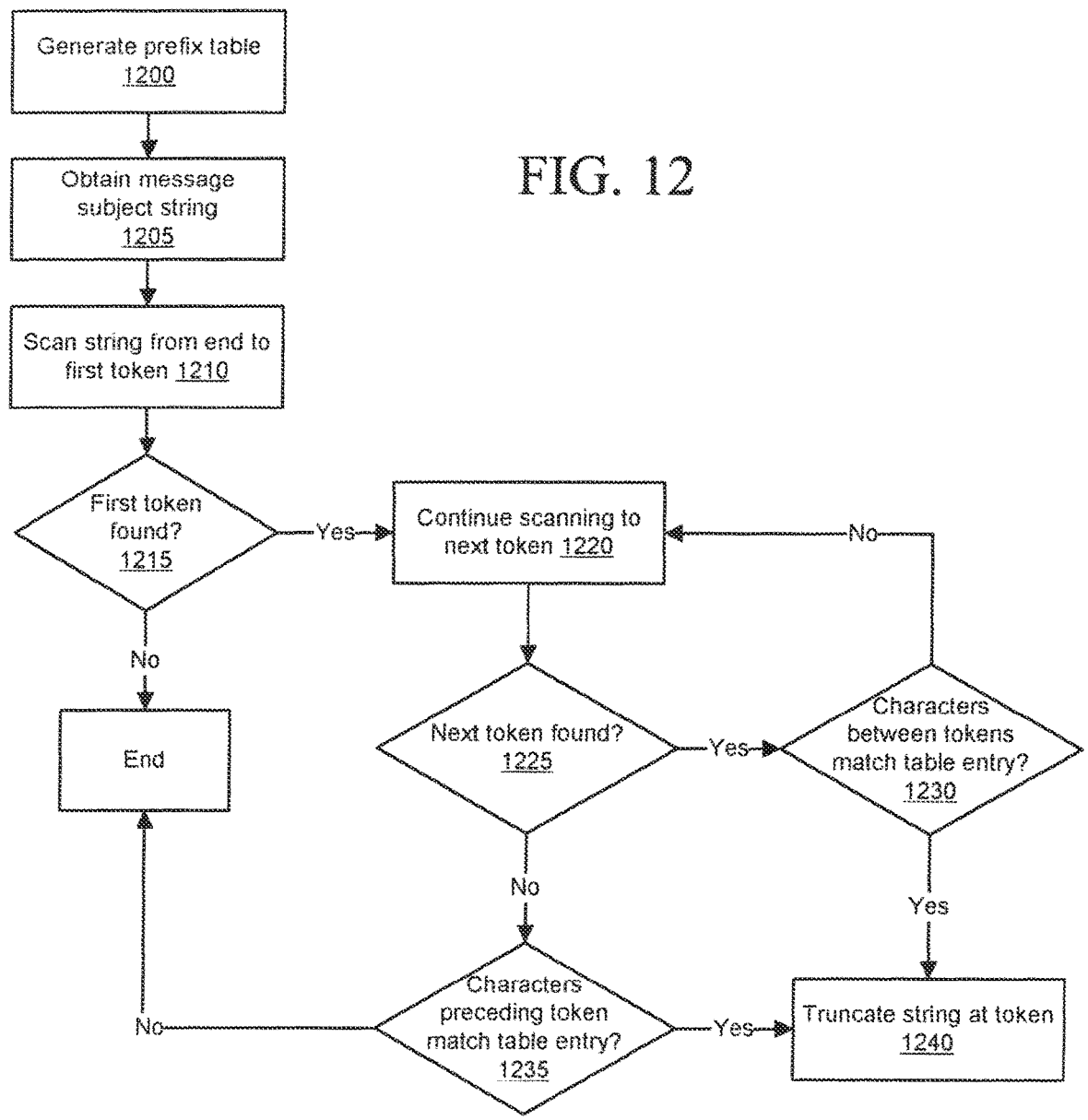
FIG. 12 is a flowchart illustrating a method for stripping subject lines prior to group identifier generation.

As noted previously, when a group identifier is generated for an incoming or outgoing message, the subject line of the message is stripped of prefixes prior to hashing. As is generally known in the art, when a message is replied to or forwarded, a messaging client may prepend a prefix and token such as "Re:" or "Fwd:", where ":" is a token used to differentiate the prefix from the remainder of the subject line, to the subject line of the message to identify the message's relationship to a parent message having the same subject line. The content of the prefix, and the definition of the token, may vary according to language or predefined settings at the sender's messaging client. In some embodiments, the token may be a space character. As these prefixes and tokens can vary within a single conversation thread of reply and forwarding messages and would alter the resultant hash value described above, they are removed prior to hashing. A method for determining the stripped subject line is shown in FIG. 12.

At 1200, a prefix table representing possible subject line prefixes is constructed. The prefix table may comprise a set of hashes of any known versions of "Re", "Fwd", and their variations. These values may be restricted to localized versions of these prefixes, or may include prefixes in other languages and character sets. The prefix table is stored at the communication device 100, or where the group identifier generation process occurs. At 1205, a message subject string is obtained from the subject line of a message. At 1210, the subject string is scanned from the end towards the beginning until a first token, such as ":", is found.

If the first token is determined not to be found at 1215, then the process ends. If the first token is found, then at 1220 the subject line is scanned until a next token is located in the string. If a next token is determined to be found at 1225, then at 1230 the characters between the first and next tokens, stripped of any leading and trailing spaces, are hashed and matched against the prefix table. If a match is found, then the subject line string is truncated at the first token at 1240 to provide the stripped subject line for generating the group identifier. If no match is found, the process continues scanning the subject line to the next token at 1220, and the process at 1225 repeats.

If at 1225 it is determined that there are no further tokens in the subject line, then at 1235 the characters preceding the token, stripped of any leading or trailing spaces, are hashed and matched against the prefix table. If a match is found, then the string is truncated at the token at 1240 to provide the stripped subject line. If no match is found, then the process ends, and the subject line is not stripped.

The communication device 100 may be operated with content protection enabled, in which data stored in device memory is encrypted when the device is in a locked state. Entry into the locked state may occur in response to an explicit user instruction received via an input means at the device 100, or in response to a detected inactivity timeout at the device 100. When the device 100 is in a locked state, it may be returned to an unlocked state upon execution of an authorization function, for example verification of a user-entered password. While the device 100 is in the locked state, applications may continue executing on the device 100, but cannot access the device's data stores, since the data is encrypted. Attempts to access the protected data may cause the device's operating system to throw an exception and return an error message string to the application attempting to access the data, rather than the data sought. Accordingly, if a new message arrives while the device is locked and stored data is encrypted, the new message may be stored on the device 100 in encrypted form since a message receiving and collecting process may be currently executing; however, an attempt by the conversations manager to subsequently generate the group identifier for the incoming message in response to detection of the new message may fail because the conversations manager is attempting to retrieve the received message after it has already been encrypted and stored in device memory.

In this circumstance, the conversations manager may be configured to detect when content protection is enabled on the device 100. When content protection is detected, instead of the conversations manager attempting to retrieve the subject line of the message from the message store, a transmission service module executing on the device 100 inspects the header data in incoming raw messages prior to storage in device memory. The raw header data may then be passed to the conversations manager to generate a hash and group identifier for that message. Any messages received by the communication device 100 while content protection is enabled are processed in this way, and temporarily stored in association with these group identifiers and subject lines generated from the raw header data. The conversations associated with these group identifiers are marked as "encrypted" and the conversations or message group identifiers are queued by the conversations manager.

When the device is unlocked and content protection is disabled, the conversations manager may then process all messages and conversations associated with group identifiers generated during the period that content protection was enabled. Since a large number of messages may have been queued by the conversations manager while the device was in content protection mode, a new thread, separate from the main thread handling requests for sorting and displaying message groups in the user interface, may be spawned by the conversations manager to handle the queued messages. This new thread then retrieves subject lines from the message store for each of the messages queued by the conversations manager, updates the common subject line associated with the group identifier, and updates the group identifier based on the updated common subject line. This updated subject line and group identifier information may then be written to the message store, and the conversation associated with the raw subject line and previous group identifier may be deleted from the queue.

The process of generating group identifiers described in FIG. 10, above, may be carried out upon the receipt or transmission of messages at the communication device 100. However, if the message store at the communication device 100 is reloaded or restructured, or the first time message grouping is applied to an existing message store, group identifier assignment or reassignment may be carried out against the entire message store in a separate thread, executing in the background while the device carries out other operations.

The group identifier assignment thread can take some time to finish. To minimize the risk of corruption of the message store while this thread runs in the background, the thread may be configured to write status information to persistent memory, such as flash memory 108, indicating that the group identifier assignment process was set to run. When the thread completes the process, this status information is deleted from memory. Upon device restart, the device 100 checks the status information in the persistent memory. If the status information is present, then the thread was interrupted and not permitted to terminate, so the communication device 100 may then re-initiate the group identifier assignment process. If the status information is not present, then the thread was able to terminate.

In addition, when the group identifier thread is initiated, a second thread may also be initiated and left idle until a notification is received that the messaging application has been launched on the communication device 100. The second thread then determines if the group identifier assignment thread is still running on the message store. If the group identifier assignment thread is still running, then the second thread may push a notification to the device display 110, such as a progress bar or other message indicating that the message store is in use. When the group identifier assignment thread is completed, the second thread is notified, and the progress bar or other message dismissed so that the messaging application can then proceed to launch.

During the course of group identifier generation for a newly received or transmitted message, and furthermore as messages are moved, deleted, and the message store otherwise updated, the communication device 100 will store changes to the message store in volatile memory prior to writing these changes to persistent memory, such as the flash memory 108. However, to maintain acceptable performance of the communication device 100, commitment of changes to persistent memory might only be carried out when the device is idle; thus, if the communication device 100 is rebooted before the device has idled sufficiently to permit the device to complete writing changes to persistent memory, the changes stored in volatile memory may be lost.

Therefore, the conversations manager may maintain an array or "dirty cache" where changes may be temporarily stored at lower processing expense than committing the changes to persistent memory. When changes are made to the message store, such as receipt of a new message, deletion, moving, or generation of group identifiers, these changes are written first by the conversations manager to the dirty cache. When the device 100 idles, the changes are then committed to persistent memory and the dirty cache is cleared.

Upon device reboot, the dirty cache is checked to verify that it is empty. If the dirty cache is not empty, then changes to the message store prior to reboot were not made; these changes are therefore applied to the message store, but the dirty cache is not cleared until the next time the content of the cache is committed to persistent memory.

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that steps and the order of the steps in the processing described herein may be altered, modified and/or augmented and still achieve the desired outcome. It will also be appreciated that although the embodiments herein have been directed generally to e-mail messages, similar systems and methods may be carried out in respect of other types of messages. Further, as described above, messages may be grouped according to subject line. Alternatively or additionally, however, messages may also be grouped according to thread identifiers, if messages are provided with thread identifying information, or by other conversational paradigms. As explained above, for example, messages may be assigned group identifiers based on sender or recipient identity, or based on other message content. Thus, even if the subject line of the message is changed, the message may still be associated with a predetermined group identifier.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method, comprising:
receiving, by a communication device, a plurality of messages for at least one user account associated with the communication device;
displaying, on a display screen of the communication device, a message listing comprising a plurality of message thread entries corresponding to a plurality of message threads, the plurality of message threads including the received plurality of messages;
detecting selection of one of the message thread entries;
in response to detecting the selection:
displaying, on the display screen, messages of a first message thread corresponding to the selection in a grouped view, the grouped view displaying a first message from the first message thread in expanded form and all other messages of the first message thread in collapsed form;
detecting a command to scroll through messages displayed on the display screen;
causing scrolling of the displayed messages in the grouped view;
detecting that a message header portion of the first message has moved beyond a target area of the display screen as a result of the scrolling; and
in response to detecting that the message header portion of the first message has moved beyond the target area of the display screen:
determining that a message header portion of a second message in the grouped view has reached the target area; and
in response to the determining, automatically changing display of the first message to collapsed form and the second message to expanded form.

2. The method of claim 1, wherein each of the plurality of message thread entries comprises a textual indicator of at least one sender or recipient in the corresponding message thread.

3. The method of claim 1, wherein the plurality of messages comprises email messages.

4. The method of claim 1, wherein the plurality of messages comprises either SMS messages or instant messages.

5. The method of claim 1, further comprising, after receiving the plurality of messages and before displaying the message listing:
determining a message thread identifier for each message of the plurality of messages, the message thread identifier being derived from at least an identifier for the at least one user account and a message subject value for the message.

6. A communication device configured to send and receive messages, the communication device comprising:
a display screen; and
a processor configured to, for a plurality of messages received for at least one user account associated with the communication device:
display, on the display screen, a message listing comprising a plurality of message thread entries corresponding to a plurality of message threads, the plurality of message threads including the received plurality of messages;
detect selection of one of the message thread entries;
in response to detecting the selection:
display, on the display screen, messages of a first message thread corresponding to the selection in a grouped view, the grouped view displaying a first message from the first message thread in expanded form and all other messages of the first message thread in collapsed form;
detect a command to scroll through messages displayed on the display screen;
cause scrolling of the displayed messages in the grouped view;
detect that a message header portion of the first message has moved beyond a target area of the display screen as a result of the scrolling; and
in response to detecting that the message header portion of the first message has moved beyond the target area of the display screen:
determine that a message header portion of a second message in the grouped view has reached the target area; and
in response to the determining, automatically change display of the first message to collapsed form and the second message to expanded form.

7. The communication device of claim 6, wherein each of the plurality of message thread entries comprises a textual indicator of at least one sender or recipient in the corresponding message thread.

8. The communication device of claim 6, wherein the plurality of messages comprises at least one of email messages, SMS messages, and instant messages.

9. The communication device of claim 6, wherein the processor is further configured to determine a message thread identifier for each message of the plurality of messages, the message thread identifier being derived from at least an identifier for the at least one user account and a message subject value for the message.

10. A non-transitory computer-readable medium storing code which, when executed by a processor of a computing device, causes the computing device to implement the method of:
receiving, over a communication subsystem, a plurality of messages for at least one user account associated with the computing device;
displaying, on a display screen of the computing device, a message listing comprising a plurality of message thread entries corresponding to a plurality of message threads, the plurality of message threads including the received plurality of messages;
detecting selection of one of the message thread entries;
in response to detecting the selection:
displaying, on the display screen, messages of a first message thread corresponding to the selection in a grouped view, the grouped view displaying a first message from the first message thread in expanded form and all other messages of the first message thread in collapsed form;

detecting a command to scroll through messages displayed on the display screen;

causing scrolling of the displayed messages in the grouped view;

detecting that a message header portion of the first message has moved beyond a target area of the display screen as a result of the scrolling; and in response to detecting that the message header portion of the first message has moved beyond the target area of the display screen:

determining that a message header portion of a second message in the grouped view has reached the target area; and in response to the determining, automatically changing display of the first message to collapsed form and the second message to expanded form.

11. The method of claim 1, wherein the first message is an oldest message from the first message thread that has not been read.

12. The method of claim 1, wherein displaying a message in collapsed form comprises displaying only partial header information for the message.

13. The communication device of claim 6, wherein the first message is an oldest message from the first message thread that has not been read.

14. The communication device of claim 6, wherein displaying a message in collapsed form comprises displaying only partial header information for the message.

15. The non-transitory computer-readable medium of claim 10, wherein the first message is an oldest message from the first message thread that has not been read.

16. The non-transitory computer-readable medium of claim 10, wherein displaying a message in collapsed form comprises displaying only partial header information for the message.

* * * * *